US012785230B2

(12) United States Patent
Zeng

(10) Patent No.: US 12,785,230 B2
(45) Date of Patent: Nov. 3, 2026

(54) BATTERY AND ELECTRONIC DEVICE

(71) Applicant: HONOR DEVICE CO., LTD., Shenzhen (CN)

(72) Inventor: Zifan Zeng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 657 days.

(21) Appl. No.: 18/008,785

(22) PCT Filed: Aug. 24, 2022

(86) PCT No.: PCT/CN2022/114625
§ 371 (c)(1),
(2) Date: Dec. 7, 2022

(87) PCT Pub. No.: WO2023/124150
PCT Pub. Date: Jul. 6, 2023

(65) Prior Publication Data

US 2024/0186666 A1 Jun. 6, 2024

(30) Foreign Application Priority Data

Dec. 30, 2021 (CN) ......................... 202111681705.0

(51) Int. Cl.
*H01M 50/581* (2021.01)
*H01M 50/474* (2021.01)

(52) U.S. Cl.
CPC ....... *H01M 50/581* (2021.01); *H01M 50/474* (2021.01)

(58) Field of Classification Search
CPC .. H01M 50/581; H01M 50/474; H01M 50/55; H01M 50/574; H01M 50/531
See application file for complete search history.

(56) References Cited

U.S. PATENT DOCUMENTS 5,766,793 A 6/1998 Kameishi et al.
5,998,051 A 12/1999 Poirier et al.
(Continued)

FOREIGN PATENT DOCUMENTS

CN 100375318 C 3/2008
CN 203553296 U 4/2014
(Continued)

OTHER PUBLICATIONS

English Translation of CN108511670 A-Battery electrode assembly, cover plate assembly and battery (Year: 2018).*

*Primary Examiner* — Adam J Francis
(74) *Attorney, Agent, or Firm* — WOMBLE BOND DICKINSON (US) LLP

(57) ABSTRACT

A battery comprising a housing, a battery cell, a thermal strain elastic component, and an electric-conductor is provided. The battery cell, the thermal strain elastic component, and the electric-conductor are disposed inside the housing. When a temperature of the battery cell is less than a threshold, the electric-conductor is electrically connected to the housing. When the temperature of the battery cell is greater than or equal to the threshold, the thermal strain elastic component is deformed, so that the electric-conductor is separated from the housing. An overheat structure formed by the housing, the battery cell, the thermal strain elastic component, and the electric-conductor is disposed at a tab inside the housing. A heat transfer path between the foregoing protection structure and a region with a highest temperature in the battery is short, and the foregoing protection structure is directly connected to a current collector in the battery cell.

20 Claims, 22 Drawing Sheets

(56) References Cited

U.S. PATENT DOCUMENTS

| | | | | |
|---|---|---|---|---|
| 6,451,474 | B1 | 9/2002 | Kozu et al. | |
| 11,145,944 | B2 | 10/2021 | Song et al. | |
| 2005/0266302 | A1* | 12/2005 | Kim | H01M 50/176 429/174 |
| 2014/0334055 | A1* | 11/2014 | Namikawa | H01H 61/04 429/61 |
| 2016/0043381 | A1 | 2/2016 | Byun et al. | |
| 2019/0013509 | A1* | 1/2019 | Park | H01M 50/55 |
| 2019/0363334 | A1* | 11/2019 | Motokawa | H01M 50/505 |

FOREIGN PATENT DOCUMENTS

| | | | | | |
|---|---|---|---|---|---|
| CN | 105552258 | A | | 5/2016 | |
| CN | 107093698 | A | | 8/2017 | |
| CN | 108511670 | A | * | 9/2018 | H01M 50/581 |
| CN | 208433461 | U | | 1/2019 | |
| CN | 109326763 | A | | 2/2019 | |
| CN | 208608239 | U | | 3/2019 | |
| CN | 109962205 | A | | 7/2019 | |
| CN | 110120557 | A | | 8/2019 | |
| CN | 112968256 | A | | 6/2021 | |
| CN | 214254552 | U | | 9/2021 | |
| JP | 3035325 | U | | 3/1997 | |
| JP | H11224658 | A | | 8/1999 | |
| JP | 2009272162 | A | | 11/2009 | |
| JP | 2011181409 | A | * | 9/2011 | |
| JP | 2013179042 | A | | 9/2013 | |
| JP | 2013218816 | A | | 10/2013 | |
| JP | 2016110959 | A | | 6/2016 | |
| WO | 2014119095 | A1 | | 8/2014 | |
| WO | WO-2018153155 | A1 | * | 8/2018 | H01M 50/147 |

* cited by examiner

BATTERY AND ELECTRONIC DEVICE

CROSS-REFERENCE TO RELATED APPLICATIONS

This application is a national stage of International Application No. PCT/CN2022/114625, filed on Aug. 24, 2022, which claims priority to Chinese Patent Application No. 202111681705.0, filed on Dec. 30, 2021. The disclosures of both of the aforementioned application are hereby incorporated by reference in their entireties.

TECHNICAL FIELD

This application relates to the battery field, and in particular, to a battery with an overheat protection function and an electronic device.

BACKGROUND

A battery cell in an existing battery does not have an overheat protection function. Generally, an overheat protection structure, such as a circuit breaker, is disposed outside a housing of the battery cell, so as to protect the battery cell when the battery is overheated. However, an action of an existing overheat protection structure is often delayed. Because a heat transfer rate between the battery cell and the overheat protection structure is not high enough, a case in which a temperature of the battery cell increases abnormally but the overheat protection structure still does not work usually occurs. Alternatively, when the battery is overheated, a current passing through the battery is reduced to reduce generated heat, so as to resolve a problem of battery overheating. However, when the current passing through the battery is reduced, heat is still generated, and consequently, a temperature of the battery is further increased, and there is a safety risk.

SUMMARY

In view of this, it is necessary to provide a battery in which an overheat protection structure is triggered in a timely manner to implement an overheat protection function, so as to resolve the foregoing problem.

According to a first aspect, this application provides a battery, where the battery includes a housing, a battery cell, a thermal strain elastic component, and an electric-conductor. The housing includes a cavity. The battery cell is located in the cavity, and the battery cell includes a tab. The thermal strain elastic component is located between the housing and the tab, and is insulatively connected to the housing and/or the tab. The electric-conductor is located between the housing and the tab. When a temperature of the battery cell is less than a threshold, the electric-conductor is electrically connected to the housing. When the temperature of the battery cell is greater than or equal to the threshold, the thermal strain elastic component is deformed, so that the electric-conductor is separated from the housing.

In the foregoing design, an overheat protection structure (a structure formed by the housing, the battery cell, the thermal strain elastic component, and the electric-conductor) is disposed at the tab inside the housing. Compared with an overheat protection structure disposed outside the housing, a heat transfer path between the foregoing protection structure and a region with a highest temperature in the battery is short, and the foregoing protection structure is directly connected to a current collector in the battery cell, and heat conduction efficiency is high. In another structural arrangement, for example, an overheat protection structure is disposed outside the housing, a plurality of components (for example, a battery cell body, a transfer metal band, a housing, and a nickel sheet used to connect the housing and the overheat protection structure need to be passed through successively) need to be passed through for heat transfer, there is a difference between heat transfer sections in different components, and heat conduction efficiency is low: Therefore, the foregoing overheat protection structure in this application has faster heat conduction, higher sensitivity of a thermal protection action, and a better battery overheat protection effect. The farther the overheat protection structure is from a region with a highest temperature in the battery, the more components need to be passed through for heat transfer, the more uncontrollable factors, and the greater the probability that the overheat protection structure does not perform an overheat protection function in a timely manner, and consequently, the battery is not safe. In addition, when the battery is overheated, the foregoing overheat protection structure disconnects an electrical connection between the electric-conductor and the housing, that is, a current in the battery is completely cut off. Before the temperature of the battery cell decreases to a safe temperature, the battery stops working to prevent generation of more heat.

In a possible design, the housing includes a first mechanical part and a second mechanical part, and the first mechanical part and the second mechanical part are insulatively connected and are enclosed to form a cavity. The tab includes a negative tab, and the thermal strain elastic component and the electric-conductor are located between the first mechanical part and the negative tab.

In the foregoing design, the overheat protection structure may be disposed at the negative tab, and may occupy empty space between the negative tab and the first mechanical part, thereby reducing a loss of volumetric energy density caused by an additional overheat protection structure disposed outside the housing.

In a possible design, the housing includes a first mechanical part and a second mechanical part, and the first mechanical part and the second mechanical part are insulatively connected and are enclosed to form a cavity. The tab includes a positive tab, and the thermal strain elastic component and the electric-conductor are located between the second mechanical part and the positive tab.

In the foregoing design, the overheat protection structure may alternatively be disposed at the positive tab, which may also trigger the overheat protection structure in a timely manner to implement an overheat protection function.

In a possible design, the housing includes a first mechanical part and a second mechanical part, and the first mechanical part and the second mechanical part are insulatively connected and are enclosed to form a cavity. The tab includes a negative tab and a positive tab, the thermal strain elastic component includes a first thermal strain elastic component and a second thermal strain elastic component, and the electric-conductor includes a first electric-conductor and a second electric-conductor. The first thermal strain elastic component and the first electric-conductor are located between the first mechanical part and the negative tab. The second thermal strain elastic component and the second electric-conductor are located between the second mechanical part and the positive tab.

In the foregoing design, overheat protection structures are disposed at both the negative tab and the positive tab, so that the battery has a dual overheat protection function, thereby further improving safety of implementing timely overheat protection of the battery.

In a possible design, the electric-conductor includes a body part and a convex part, the body part is connected to the convex part, the body part is connected to the tab and the thermal strain elastic component, and the convex part faces the housing and is detachably connected to the housing.

In the foregoing design, the body part is configured to be connected to the tab and the thermal strain elastic component, and the thermal strain elastic component is configured to control a distance between the body part and the housing based on a temperature, so that the convex part is in contact with the housing to implement an electrical connection, or the convex part is separated from the housing to cut off a current.

In a possible design, the thermal strain elastic component is located on a surface that is of the body part and that faces the housing, and the thermal strain elastic component is spaced apart from the convex part.

In the foregoing design, a concave area is formed between the convex part and the body part, and the concave area is used to accommodate the thermal strain elastic component, so that space between the housing and the tab is fully utilized while the electric-conductor meets an electrical conduction requirement, so as to avoid arranging additional space to accommodate the thermal strain elastic component. The spaced arrangement may reserve expansion space for the thermal strain elastic component.

In a possible design, there are a plurality of thermal strain elastic components, and the plurality of thermal strain elastic components are enclosed around a peripheral edge of the convex part and are connected to the housing.

In the foregoing design, the plurality of thermal strain elastic components may make a force acting on the body part more even and greater, so that sensitivity of separating the housing and the electric-conductor can be improved, and the electric-conductor is separated from the housing in a timely manner to cut off a current.

In a possible design, the thermal strain elastic component is a hollow ring, the convex part is located in a middle of the thermal strain elastic component, and the thermal strain elastic component is enclosed around the peripheral edge of the convex part.

In the foregoing design, a ring-shaped thermal strain elastic component may further make the force acting on the body part more even and greater, so that the sensitivity of separating the housing and the electric-conductor can be improved, and the electric-conductor is separated from the housing in a timely manner to cut off a current.

In a possible design, the thermal strain elastic component is connected to a part of a surface that is of the body part and that faces the housing. The battery further includes a supporter, where the supporter is located on a side that is of the thermal strain elastic component and that is away from the convex part, and the supporter is fastened to the housing and connected to the body part.

In the foregoing design, when the thermal strain elastic component is thermally expanded, the electric-conductor takes the supporter as a fulcrum, and one end with the convex part rotates in a direction away from the housing, so that the convex part can be separated from the housing in a timely manner, thereby improving sensitivity of a thermal protection action, and avoiding that it is difficult to separate the electric-conductor from the housing due to a skew.

In a possible design, on a cross section of the thermal strain elastic component along an overlaying direction of the housing, the thermal strain elastic component, and the electric-conductor, the thermal strain elastic component has a first length on a side facing the convex part, and the thermal strain elastic component has a second length on a side away from the convex part, where the first length is greater than the second length.

In the foregoing design, when the thermal strain elastic component is thermally expanded, and a thermal expansion coefficient is the same, the thermal strain elastic component generates a greater amount of deformation on a side facing the convex part than on a side away from the convex part, so as to ensure that the thermal strain elastic component expands to separate the convex part from the first mechanical part.

In a possible design, the cross section of the thermal strain elastic component along an overlaying direction of the housing, the thermal strain elastic component, and the electric-conductor is a trapezoid or a triangle.

The foregoing design is a possible implementation of a shape of the thermal strain elastic component.

In a possible design, a part of the thermal strain elastic component is embedded in the body part.

In the foregoing design, a contact area between the thermal strain elastic component and the electric-conductor may be increased, so as to further improve the heat transfer from the thermal strain elastic component to the electric-conductor, thereby improving sensitivity of the overheat protection structure. In addition, when a part of the thermal strain elastic component is embedded in the body part, and some space may be reduced.

In a possible design, a shape of the thermal strain elastic component is at least one of a cuboid, a cube, an ellipsoid, and a semi-ellipsoid.

The foregoing design is a possible implementation of a shape of the thermal strain elastic component.

In a possible design, a material of the thermal strain elastic component is an insulating material.

In the foregoing design, the thermal strain elastic component may be an insulating material known in the art that can be significantly expanded and deformed when a threshold is reached.

In a possible design, a material of the thermal strain elastic component is a conductive material, the battery further includes an insulation layer, and the insulation layer is located between the thermal strain elastic component and the housing and/or the body part.

In the foregoing design, the thermal strain elastic component may be a conductive material known in the art that can be significantly expanded and deformed when a threshold is reached, and the insulation layer is disposed, so that the thermal strain elastic component is insulatively connected to the housing and/or the body part.

In a possible design, the threshold is 70° C. to 75° C.

In the foregoing design, the threshold is 70° C. to 75° C. to meet a battery overheat protection requirement.

In a possible design, the first mechanical part is a metal shell, and the second mechanical part is a battery post: or both the first mechanical part and the second mechanical part are metal shells.

In the foregoing design, a specific arrangement form of the first mechanical part and the second mechanical part is related to a type of the battery.

In a possible design, materials of the first mechanical part and the second mechanical part may be both metal alloys, metals, or other conductive materials.

In a possible design, the tab is assembled from a plurality of sub-tabs.

In the foregoing design, when the tab (including a negative tab and/or a positive tab) is assembled from a plurality of sub-tabs, the electric-conductor may also be configured to connect the plurality of sub-tabs, and no additional metal strip is needed to connect the plurality of sub-tabs.

According to a second aspect, this application provides an electronic device, where the electronic device includes the foregoing battery with an overheat protection structure.

DESCRIPTION OF REFERENCE SIGNS OF MAIN COMPONENTS

| | |
|---|---|
| Battery | 100, 100a, 100b, 100c, 100d, 100e, 100f, 100g, 100h, 100i, 100j, 100' |
| Overheat protection structure | 105' |
| Metal strip | 110' |
| Housing | 10, 10' |
| First mechanical part | 11, 11' |
| Second mechanical part | 13, 13' |
| Cavity | 15 |
| Battery cell | 20, 20' |
| Main body | 21 |
| Tab | 23 |
| Negative tab | 231, 231' |
| Positive tab | 233, 233' |
| Thermal strain elastic component | 30, 30a, 30b, 30c, 30d, 30e, 30f, 30g, 30h, 30i, 30j |
| First surface | 31 |
| Second surface | 33 |
| Insulation layer | 35 |
| First thermal strain elastic component | 37 |
| Second thermal strain elastic component | 39 |
| Electric-conductor | 40, 40a, 40b, 40c, 40d, 40e, 40f, 40g, 40h, 40i, 40j |
| Body part | 41, 41a, 41b, 41c, 41d, 41e, 41f, 41g, 41h, 41i, 41j |
| Convex part | 43, 43a, 43b, 43c, 43d, 43e, 43f, 43g, 43h, 43i, 43j |
| First electric-conductor | 45 |
| Second electric-conductor | 47 |
| Supporter | 50 |
| Electronic device | 200 |
| First length | L1 |
| Second length | L2 |

DESCRIPTION OF EMBODIMENTS

To better understand the foregoing objects, features, and advantages of this application, the following describes this application in detail with reference to accompanying drawings and specific implementations. It should be noted that, if there is no conflict, the implementations and the features in the implementations of this application may be mutually combined. Many specific details are described in the following description, so that this application can be fully understood. The described implementations are merely some rather than all of the implementations of this application.

Unless otherwise defined, all technical and scientific terms used in this specification have the same meaning as those commonly understood by persons skilled in the art of this application. The terms used in the specification of this application are merely intended to describe specific implementations, and are not intended to limit this application. The term "and/or" as used herein includes all and any combinations of one or more associated listed items.

In embodiments of this application, for ease of description but not limitation of this application, the term "connection" used in the specification and claims of this application is not limited to a physical or mechanical connection, whether direct or indirect. "Top", "bottom", "above", "below", "left", "right", and the like are only used to indicate a relative position relationship. When an absolute position of a described object changes, the relative position relationship also correspondingly changes.

Figure 1:
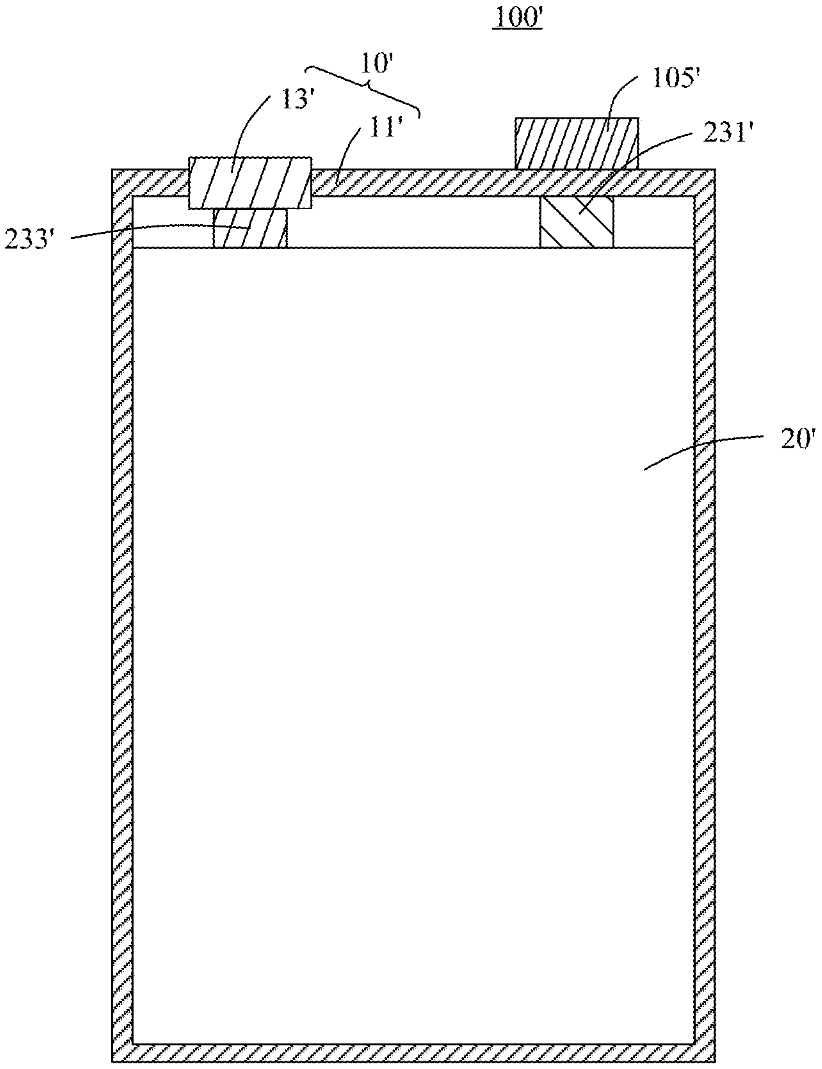
FIG. 1 is a sectional schematic diagram of a structure of a battery according to a related technology of this application.
Figure 2:
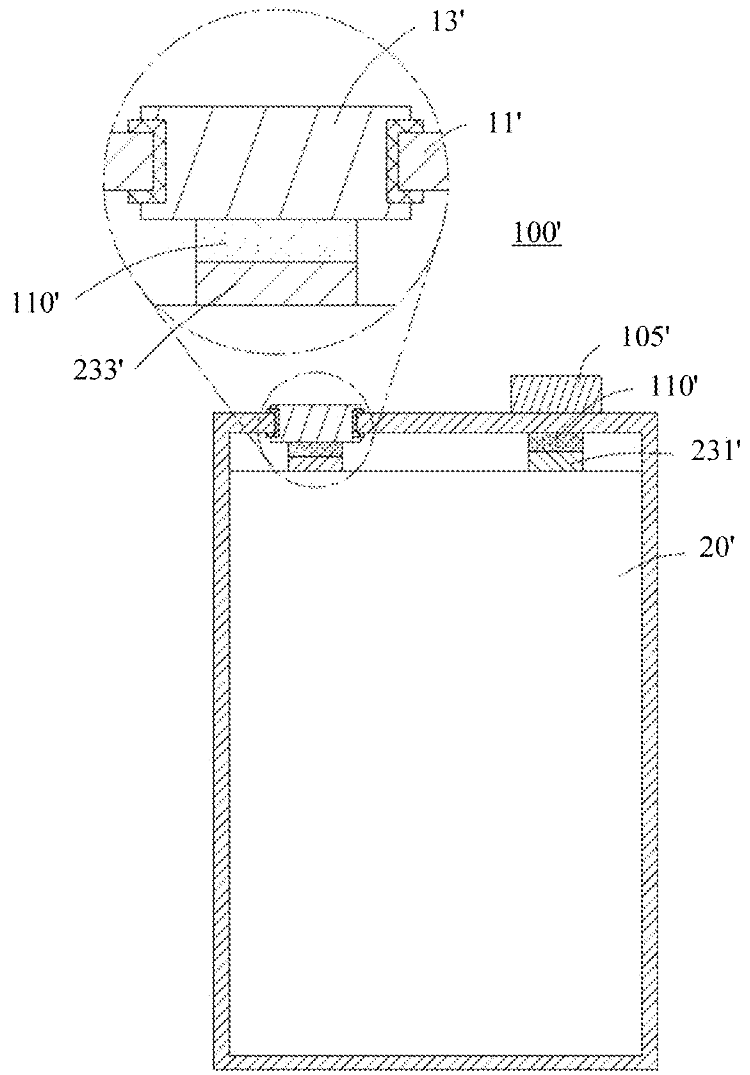
FIG. 2 is a sectional schematic diagram of a battery with a metal strip according to a related technology of this application.

Referring to FIG. 1, a schematic diagram of a structure of a battery 100' is provided in a related technology. The battery 100' includes a housing 10', a battery cell 20', and an overheat protection structure 105'. The housing 10' includes a first mechanical part 11' and a second mechanical part 13' that are insulatively connected to each other. The battery cell 20' is disposed in the housing 10'. The battery cell 20' includes a negative tab 231' and a positive tab 233', where the negative tab 231' is electrically connected to the first mechanical part 11', and the positive tab 233' is electrically connected to the second mechanical part 13'. The overheat protection structure 105' is disposed outside the housing 10'. Referring to FIG. 2, when there are a plurality of negative tabs 231' and/or positive tabs 233' in the battery cell 20', a metal strip 110' (as shown in FIG. 2) may also be used for connection, so that the plurality of negative tabs 231' are electrically connected to the first mechanical part 11', and the plurality of positive tabs 233' are electrically connected to the second mechanical part 13'.

According to the related technology, in the battery 100', the overheat protection structure 105' is generally disposed outside the housing 10': and a plurality of components (for example, the battery cell 20', the transfer metal strip 110', the housing 10', and a nickel sheet (not shown in the figure) used to connect the housing 10' and the overheat protection structure 105' need to be passed through successively) need to be passed through for heat transfer, there is a difference between heat transfer sections in different components, and heat conduction efficiency is low. In addition, the farther the overheat protection structure 105' is from a region with a highest temperature in the battery 100', the more components need to be passed through for heat transfer, the more uncontrollable factors, and the greater the probability that the overheat protection structure 105' does not perform an overheat protection function in a timely manner, and consequently, the battery 100' is not safe.

Figure 3:
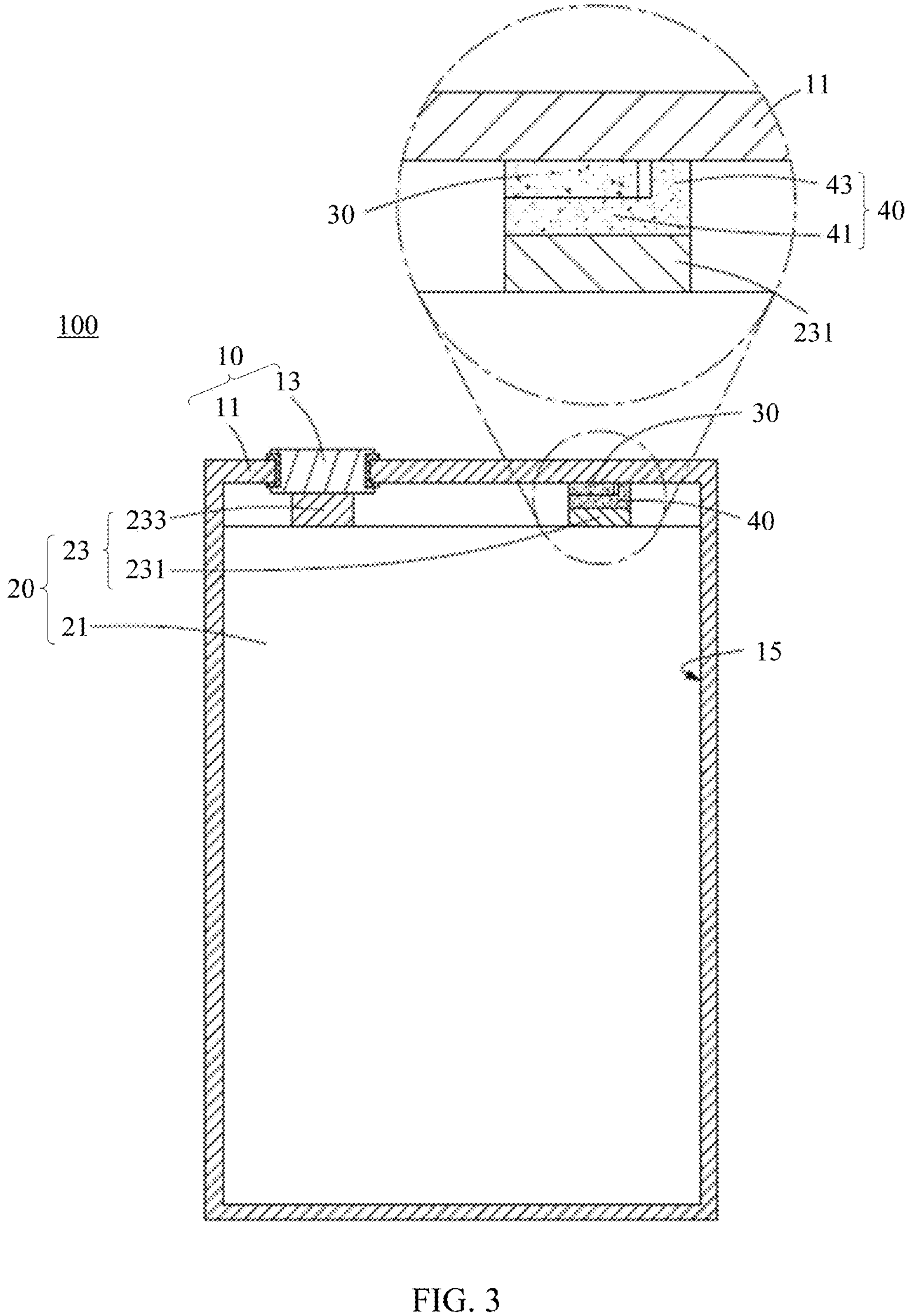
FIG. 3 is a sectional schematic diagram of a battery in which an overheat protection structure is disposed at a negative tab and the overheat protection structure is not triggered according to some embodiments of this application.

Referring to FIG. 3, an embodiment of this application provides a battery 100, and the battery 100 may be any apparatus capable of an electrochemical reaction. Specifically, the battery 100 may be all types of primary batteries, secondary batteries, and capacitors (for example, a super capacitor). Optionally, the battery 100 may be a lithium secondary battery, including a lithium metal secondary battery, a lithium ion secondary battery; a lithium polymer secondary battery; or a lithium ion polymer secondary battery.

The battery 100 includes a housing 10, a battery cell 20, a thermal strain elastic component 30, and an electric-conductor 40. The housing 10 includes a cavity 15. The battery cell 20, the thermal strain elastic component 30, and the electric-conductor 40 are all accommodated in the cavity 15. The battery cell 20 includes a tab 23. The thermal strain elastic component 30 is located between the housing 10 and the tab 23, and is insulatively connected to the housing 10 and the tab 23. The electric-conductor 40 is located between the housing 10 and the tab 23. When a temperature of the battery cell 20 is less than a threshold, the electric-conductor 40 is electrically connected to the housing 10 and the tab 23. When the temperature of the battery cell 20 is greater than or equal to the threshold, the thermal strain elastic component 30 is heated and deformed to disconnect the electric-conductor 40) from the housing 10, so that the battery 100 cuts off a current, thereby implementing an overheat protection function.

The threshold may be set as required. In some implementations, the threshold ranges from 70° ° C. to 75° C.

Referring to FIG. 3 again, some embodiments of this application provide the battery 100, where the battery 100 includes the housing 10, the battery cell 20, the thermal strain elastic component 30, and the electric-conductor 40.

The housing 10 includes a first mechanical part 11 and a second mechanical part 13, the first mechanical part 11 and the second mechanical part 13 are insulatively connected, and the first mechanical part 11 and the second mechanical part 13 may serve as terminals for connecting the battery 100 to an external circuit. The second mechanical part 13 is disposed in the first mechanical part 11, and an insulating washer (not marked in the figure) and an insulation plate (not marked in the figure) are disposed in an area in which the second mechanical part 13 is connected to the first mechanical part 11, so that the second mechanical part 13 is insulatively connected to the first mechanical part 11.

Materials of the first mechanical part 11 and the second mechanical part 13 are conductive materials, including but not limited to metals and metal alloys. Specific forms of the first mechanical part 11 and the second mechanical part 13 are related to a type of the battery 100. For example, in this embodiment, the battery 100 is a square metal shell battery, the first mechanical part 11 is a metal shell, and the second mechanical part 13 is a battery post. In some embodiments, the battery 100 may alternatively be a button battery, both the first mechanical part 11 and the second mechanical part 13 are metal shells, and the two metal shells are internally and insulatively connected.

The first mechanical part 11 and the second mechanical part 13 are enclosed to form the cavity 15, and the battery cell 20, the thermal strain elastic component 30, and the electric-conductor 40) are accommodated in the cavity 15.

The battery cell 20 includes a main body 21 and the tab 23. The tab 23 is connected to the main body 21, and the tab 23 may be led out by a current collector (not shown in the figure) in the main body 21. The tab 23 includes a negative tab 231 and a positive tab 233.

The electric-conductor 40 includes a body part 41 and a convex part 43, and the convex part 43 is connected to the body part 41. The convex part 43 and the body part 41 may be in an integral structure, or may be electrically connected in another manner (for example, through welding). In this embodiment, the convex part 43 and the body part 41 are an integrated structure. The convex part 43 is disposed at one end of a surface of the body part 41 and protrudes relative to the body part 41. The body part 41 is connected to the negative tab 231, and the convex part 43 is located on a side that is of the body part 41 and that is away from the negative tab 231 and protrudes toward the mechanical part 11. The thermal strain elastic component 30 is a cuboid. The thermal strain elastic component 30 includes a first surface 31 and a second surface 33 disposed opposite to the first surface 31. The first surface 31 is connected to the first mechanical part 11, the second surface 33 is connected to the body part 41, and the thermal strain elastic component 30 is disposed on one side of the convex part 43 and is spaced apart from the convex part 43. The thermal strain elastic component 30 is insulatively connected to the first mechanical part 11 and the electric-conductor 40. A concave area is formed between the convex part 43 and the body part 41, and the concave area is used to accommodate the thermal strain elastic component 30, so that space between the housing 10 and the tab 23 is fully utilized while the electric-conductor 40 meets an electrical conduction requirement, so as to avoid arranging additional space to accommodate the thermal strain elastic component 30. The thermal strain elastic component 30 is spaced apart from the convex part 43, because when the thermal strain elastic component 30 is heated and deformed, the thermal strain elastic component 30 also expands toward the convex part 43. The spaced arrangement may reserve specific expansion space for the thermal strain elastic component 30, to prevent the thermal strain elastic component 30 from extruding the convex part 43 due to expansion and causing the electric-conductor 40 to be dislocated, and therefore prevent it is difficult for the battery 100 to return to an original position after cooling down.

Figure 4:
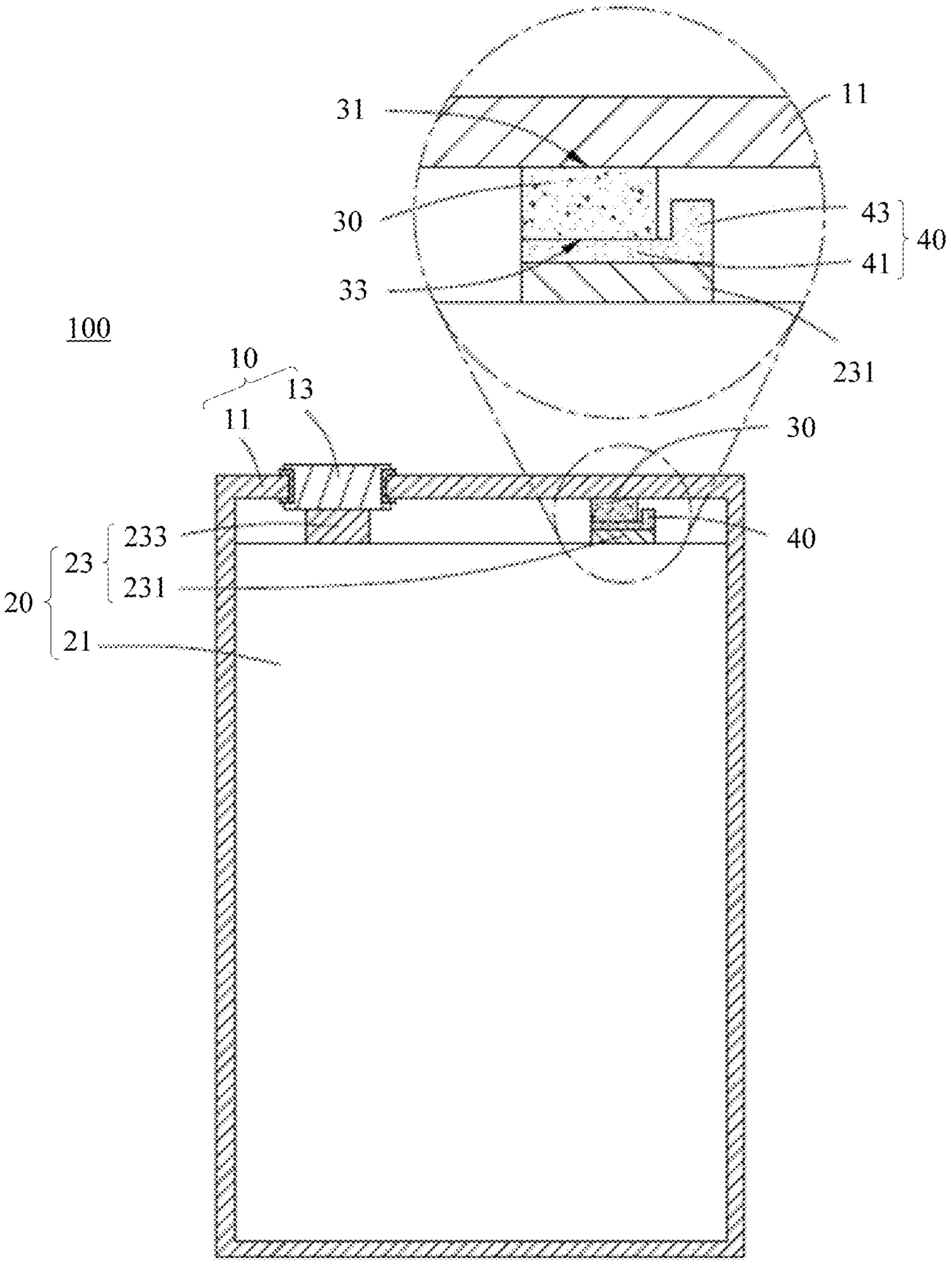
FIG. 4 is a sectional schematic diagram after the overheat protection structure shown in FIG. 3 is triggered.

When the temperature of the battery cell 20 is relatively low, that is, a temperature of the battery 100 falls within a normal use temperature range, the thermal strain elastic component 30 is not deformed or significantly deformed, and the convex part 43 is connected to the first mechanical part 11, that is, the electric-conductor 40 is electrically connected to the negative tab 231 and the first mechanical part 11, so that the battery 100 is in a conducting state, and the battery 100 can be normally used. Referring to FIG. 4, when the temperature of the battery cell 20 increases, heat is transferred to the negative tab 231 and the thermal strain elastic component 30, and the temperature of the thermal strain elastic component 30 also increases: and when the temperature is greater than or equal to the threshold for safe use of the battery 100, the thermal strain elastic component 30 is thermally expanded and deformed, so that a distance between the first mechanical part 11 and the body part 41 increases. The body part 41 moves relative to the first mechanical part 11 until the body part 41 drives the convex part 43 to separate from the first mechanical part 11, that is, the electric-conductor 40 cuts off a current between the first mechanical part 11 and the negative tab 231, so that the battery 100 is in a disconnected state and further increase in the temperature of the battery cell 20 is avoided. When the thermal strain elastic component 30 extrudes the first mechanical part 11 and the electric-conductor 40) when the thermal strain elastic component 30 is thermally expanded, if a material (for example, metal) of the first mechanical part 11 has relatively high hardness, the electric-conductor 40) moves to extrude the negative tab 231, and the negative tab 231 is compressed. When the temperature of the battery cell 20 decreases, the thermal strain elastic component 30 gradually recovers from the deformation until the convex part 43 is in contact with the first mechanical part 11, so that the battery 100 is in a conducting state again.

An overheat protection structure including the housing 10, the battery cell 20, the thermal strain elastic component 30, and the electric-conductor 40 is disposed at the negative tab 231, and occupies empty space between the negative tab 231 and the first mechanical part 11, thereby reducing a loss of volumetric energy density caused by an additional overheat protection structure disposed outside the housing 10. In addition, the foregoing overheat protection structure is disposed inside the housing 10. Compared with an overheat protection structure disposed outside the housing 10, the foregoing protection structure has a short heat transfer path with a region with a highest temperature in the battery 100 (a region of the tab 23 or a center region of the body part 21). In addition, the tab 23 and a current collector of the battery cell 20 are generally in an integral structure, heat conduction efficiency is high when heat is transferred from the current collector to the tab 23, and there is no difference between heat transfer sections. Therefore, compared with an overheat protection structure disposed outside the housing, the foregoing overheat protection structure in this application has faster thermal conduction, higher sensitivity of a heat protection action, and a better overheat protection effect for the battery 100. In addition, when the battery 100 is overheated, the foregoing overheat protection structure disconnects an electrical connection between the electric-conductor 40 and the housing 10, that is, a current in the battery 100 is completely cut off. Before the temperature of the battery cell 20 decreases to a safe temperature, the battery 100 stops working to prevent generation of more heat. Compared with a related technology in which only a current passing through a battery is reduced when the battery is overheated, this embodiment of this application can better ensure safety of the battery 100 when the battery is overheated.

The negative tab 231 is a single tab led out of the main body 21 of the battery cell 20, or may be assembled from a plurality of sub-tabs in the battery cell 20. When the negative tab 231 is assembled from a plurality of sub-tabs, the electric-conductor 40 may further be configured to connect to a plurality of sub-tabs, and no additional metal strip 110' is needed to connect to the plurality of sub-tabs.

A material of the electric-conductor 40 may be selected from metal conductive materials that are not easily deformed, such as metal nickel or nickel-plated copper (that is, nickel is plated on copper). When the battery cell 20 is heated and heat is transferred to the electric-conductor 40, the electric-conductor 40 is not easily deformed, so as to improve sensitivity of the overheat protection structure, and reduce or avoid an error caused by deformation of the electric-conductor 40 when being heated.

The electric-conductor 40 may be connected to the negative tab 231 through welding or by affixing electrically conductive double-sided tape. The electric-conductor 40 and the negative tab 231 are preferably connected through welding, to improve connection reliability of the electric-conductor 40) and the negative tab 231.

The thermal strain elastic component 30 may be connected to the first mechanical part 11 and/or the electric-conductor 40 through glue dispensing, by pasting double-sided tape, through welding, or the like. Soft silicone glue. UV glue (ultraviolet-curing glue), and AB glue (Epoxy Adhesive) may be selected for glue dispensing.

A thermal strain material used by the thermal strain elastic component 30 refers to all materials that can be significantly expanded and deformed when a threshold (for example 70° C. to 75° C.) is reached (a thermal expansion coefficient when the thermal strain material is close to or reaches the threshold is greater than a thermal expansion coefficient at a normal temperature). After the thermal strain elastic component 30 is expanded and deformed, the convex part 43 of the electric-conductor 40 is separated from the first mechanical part 11, so as to completely cut off a current. An insulating thermal strain material may be an insulating material, for example, a special nylon material. The insulating thermal strain material may alternatively be a conductive material, for example, a metal dome sheet or a bimetallic finger. When the insulating thermal strain material is a conductive material, an insulation layer 35 (refer to FIG. 5 and FIG. 6) needs to be disposed between the thermal strain elastic component 30 and the housing 10 and/or the body part 41, or the insulation layer 35 needs to be disposed on a surface of the thermal strain elastic component 30, so that the thermal strain elastic component 30 is insulatively connected to the housing 10 and the electric-conductor 40.

A shape of the thermal strain elastic component 30 is not limited to a cuboid. In another embodiment, the thermal strain elastic component 30 may alternatively be a regular cube structure such as a cube, an ellipsoid, or a semi-ellipsoid, or may be another irregular shape. The shape of the thermal strain elastic component 30 is preferably a regular cube. In this way: a direction in which the thermal strain elastic component 30 is thermally expanded can be predicted more easily, and safety and reliability of the battery 100 when the battery 100 is heated are improved. The thermal strain elastic component 30 is preferably a cube with a large contact area with a surface that is of the body part 41 and that faces the first mechanical part 11, so that heat of the tab 23 is transferred to the electric-conductor 40) and then is transferred to the thermal strain elastic component 30 in a timely manner, and the thermal strain elastic component 30 responds to a temperature at the tab 23 in a timely manner.

Figure 7:
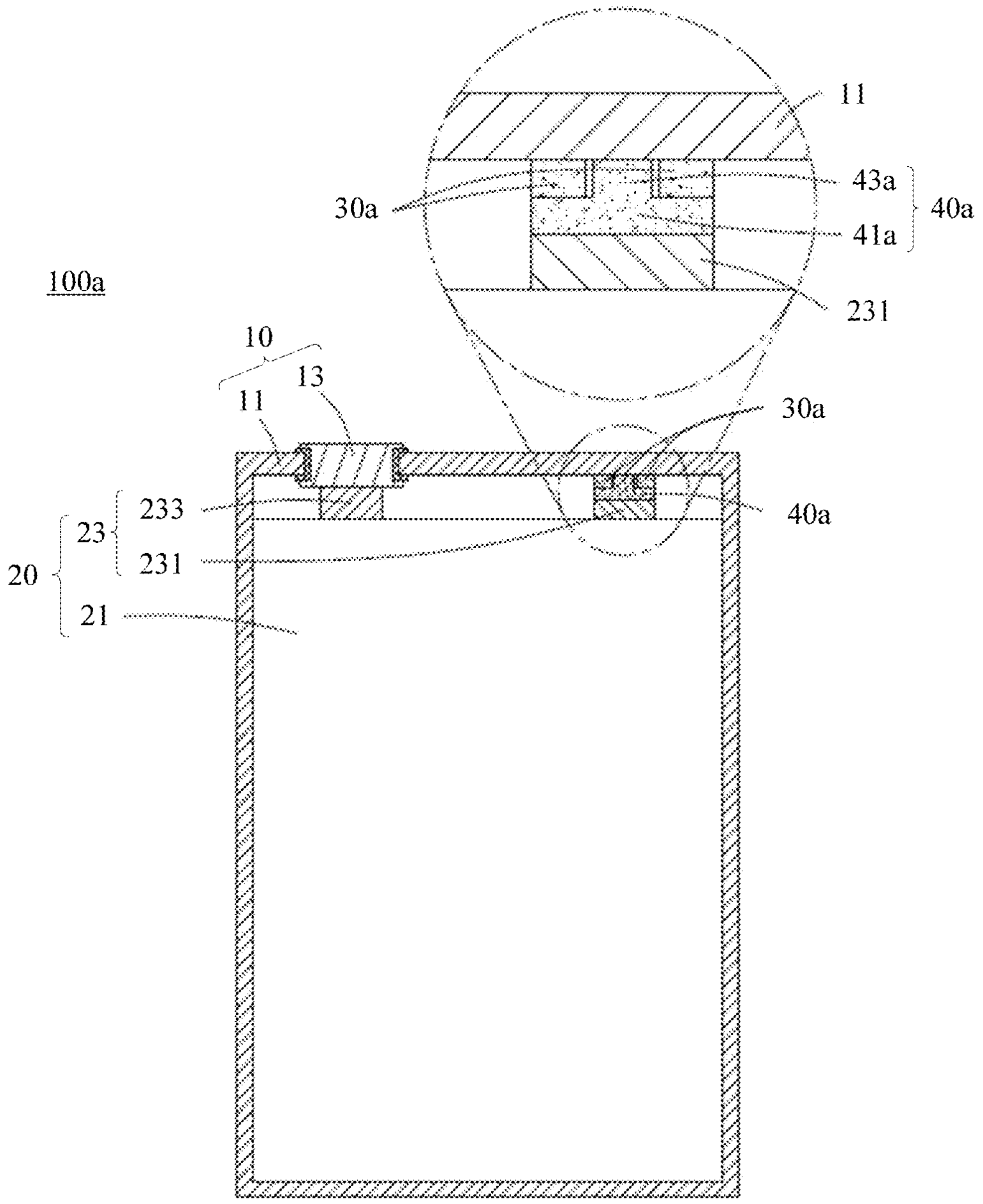
FIG. 7 is a sectional schematic diagram of a battery in which an overheat protection structure is disposed at a negative tab and the overheat protection structure is not triggered according to some embodiments of this application.
Figure 8:
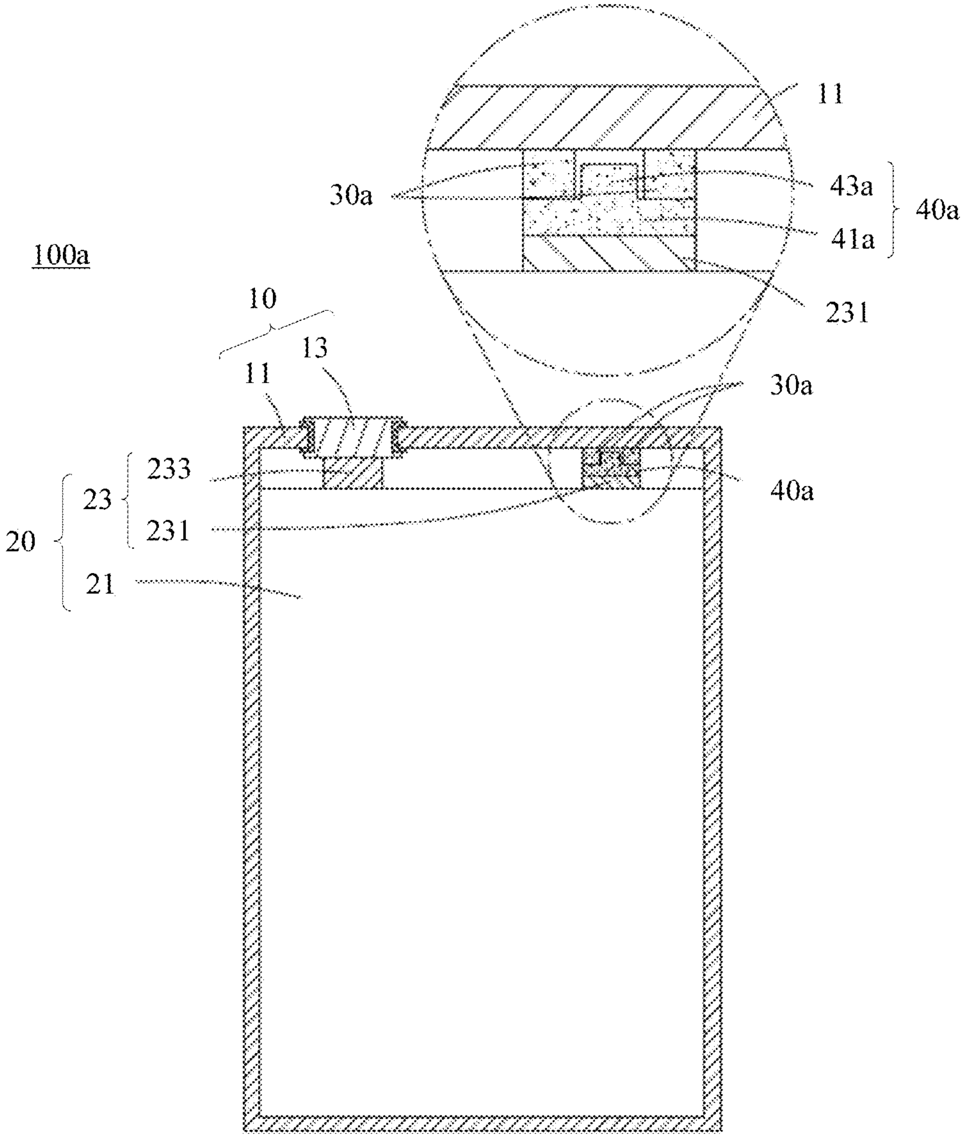
FIG. 8 is a sectional schematic diagram after the overheat protection structure shown in FIG. 7 is triggered.

Referring to FIG. 7 and FIG. 8, some embodiments of this application provide a battery 100*a*. A convex part 43*a* of an electric-conductor 40*a* protrudes from an intermediate position of a surface of a body part 41*a* of the electric-conductor 40*a*, and there are two thermal strain elastic components 30*a*, which are respectively located on two symmetrical sides of the convex part 43*a*. The two thermal strain elastic components 30*a* are symmetrically disposed. When the battery cell 20 is heated and a temperature of the battery cell 20 exceeds the threshold, the two thermal strain elastic components 30*a* may make a force acting on the body part 41*a* more even and greater, so that sensitivity of separating the first mechanical part 11 and the electric-conductor 40*a* can be improved, and the electric-conductor 40*a* is separated from the first mechanical part 11 in a timely manner to cut off a current.

In another embodiment, a quantity of the thermal strain elastic component 30*a* is not limited, and may be one or more. The thermal strain elastic component 30*a* may alternatively be a hollow ring, the convex part 43*a* is located in a middle of the thermal strain elastic component 30*a*, and the thermal strain elastic component 30*a* is disposed around a peripheral edge of the convex part 43*a*.

Figure 9:
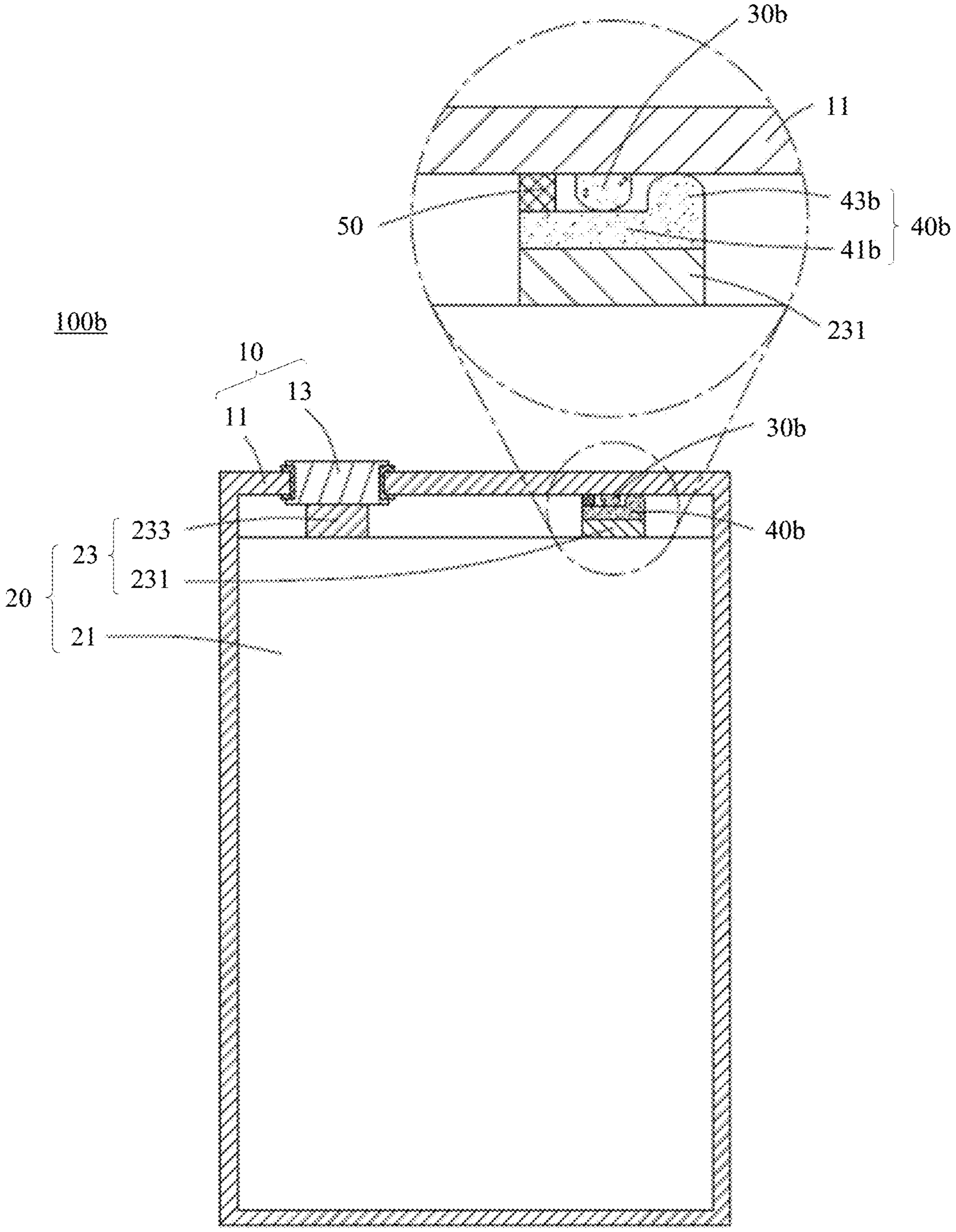
FIG. 9 is a sectional schematic diagram of a battery in which an overheat protection structure is disposed at a negative tab and the overheat protection structure is not triggered according to some embodiments of this application.
Figure 10:
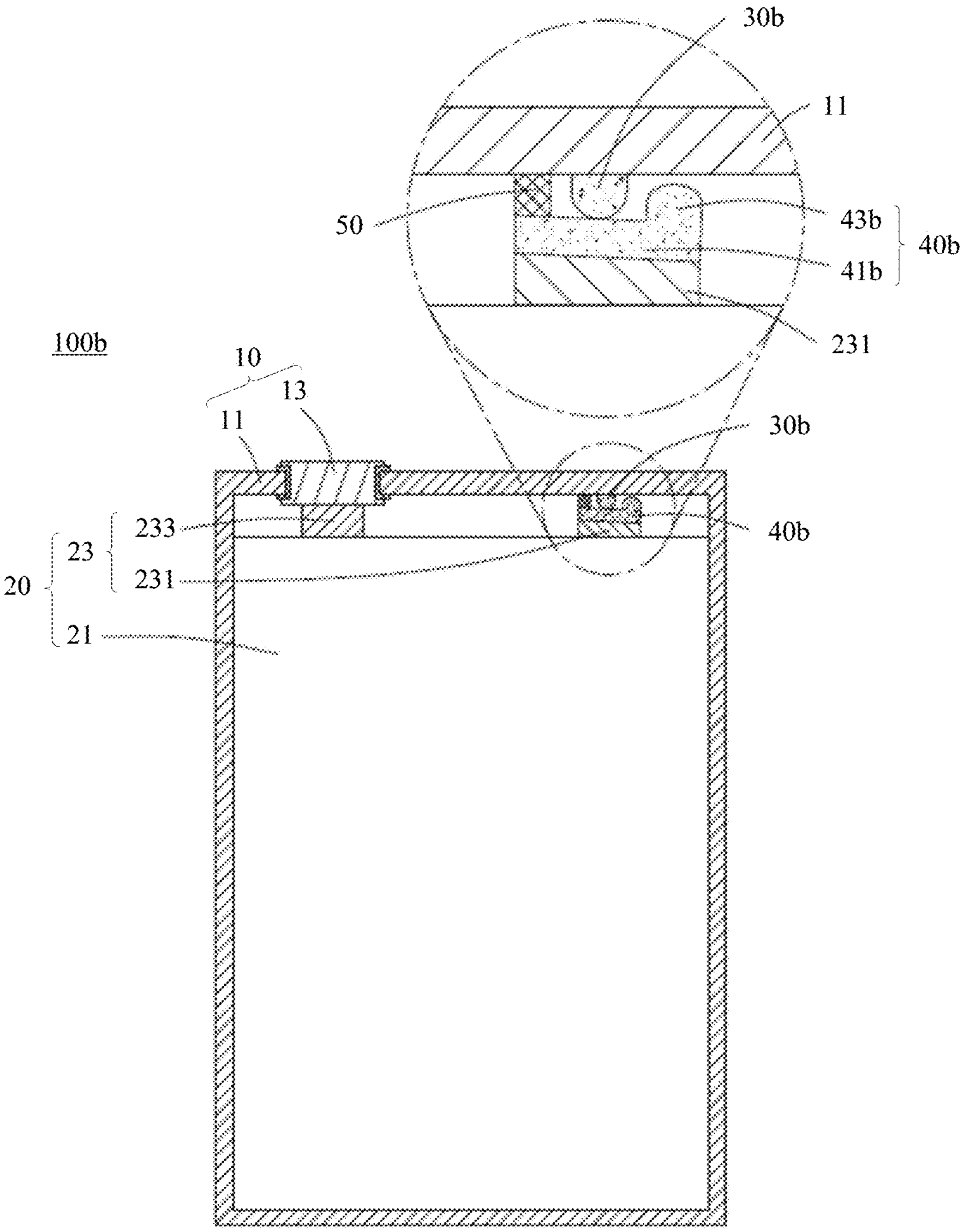
FIG. 10 is a sectional schematic diagram after the overheat protection structure shown in FIG. 9 is triggered.

Referring to FIG. 9 and FIG. 10, some embodiments of this application provide a battery 100*b*. A thermal strain elastic component 30*b* is a semi-ellipsoid, and the thermal strain elastic component 30*b* is connected to a part of a surface that is of a body part 41*b* of an electric-conductor 40*b* and that faces a first mechanical part 11. The battery 100*b* further includes a supporter 50, where the supporter 50 is located on a side that is of the thermal strain elastic component 30*b* and that faces a convex part 43*b*, and is disposed on a side that is of a body part 41*b* and that faces the first mechanical part 11. The supporter 50 is fixedly connected to the first mechanical part 11, and the supporter 50) is connected to one end of the body part 41*b*, so as to limit a distance between the supporter 50 and the body part 41*b*. The supporter 50 is electrically insulated from the first mechanical part 11 and the negative tab 231.

When the thermal strain elastic component 30*b* is thermally expanded, the thermal strain elastic component 30*b* drives the electric-conductor 40*b* to move relative to the first mechanical part 11, and the supporter 50 is configured to abut against an end that is of the electric-conductor 40*b* and that is away from the convex part 43*b*. The electric-conductor 40*b* takes the supporter 50 as a fulcrum, and one end with the convex part 43 rotates in a direction away from the first mechanical part 11, so that the convex part 43*b* can be separated from the first mechanical part 11 in a timely manner, thereby improving sensitivity of a thermal protection action, and avoiding that it is difficult to separate the electric-conductor 40*b* from the first mechanical part 11 due to a skew.

Figure 11:
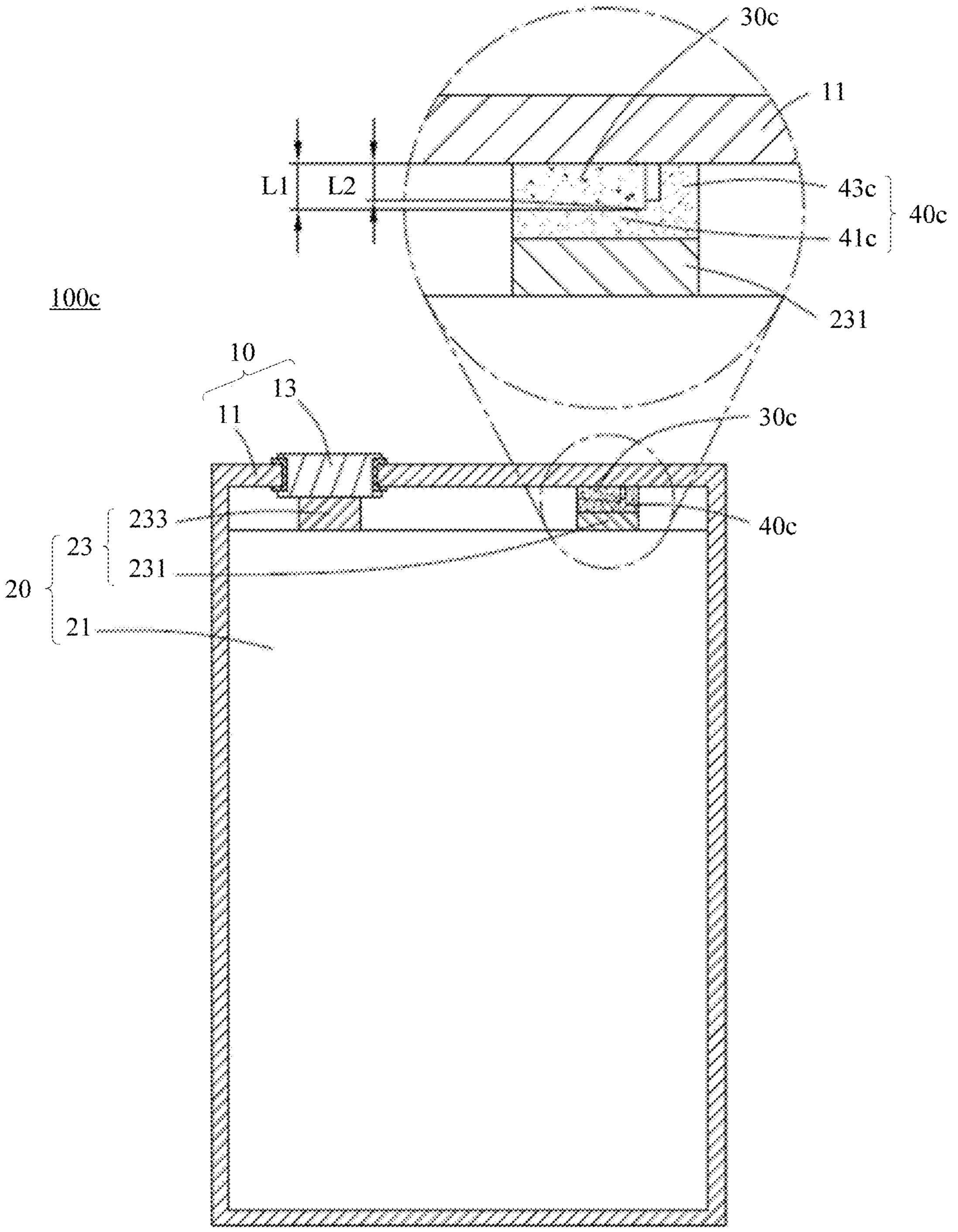
FIG. 11 is a sectional schematic diagram of a battery in which an overheat protection structure is disposed at a negative tab and the overheat protection structure is not triggered according to some embodiments of this application.

Referring to FIG. 11, some embodiments of this application provide a battery 100*c*. On a cross section of the thermal strain elastic component 30*c* along an overlaying direction of the housing 10, the thermal strain elastic component 30*c*, and the electric-conductor 40*c*, the thermal strain elastic component 30*c* has a first length L1 on a side facing the convex part 43*c*, and the thermal strain elastic component 30*c* has a second length L2 on a side away from the convex part 43*c*, where the first length L1 is greater than the second length L2. For example, a regular-shaped trapezoid is used as an example. A long side of the trapezoid faces the convex part 43*c*, and a short side of the trapezoid is away from the convex part 43*c*.

When the thermal strain elastic component 30*c* is thermally expanded, and a thermal expansion coefficient is the same, the thermal strain elastic component 30*c* generates a greater amount of deformation on a side facing the convex part 43*c* than on a side away from the convex part 43*c*, so as to ensure that the thermal strain elastic component 30*c* expands to separate the convex part 43*c* from the first mechanical part 11.

A part that is of the thermal strain elastic component 30*c* and that is close to the convex part 43*c* may alternatively be embedded in the body part 41*c*, and a contact area between the thermal strain elastic component 30*c* and the electric-conductor 40*c* may be increased, so as to further improve heat transfer of the electric-conductor 40*c* to the thermal strain elastic component 30*c*, thereby improving sensitivity of an overheat protection structure. In addition, when a part of the thermal strain elastic component 30*c* is embedded in the body part 41*c*, some space may be reduced. It may be understood that, in another embodiment, a part of the thermal strain elastic component 30*c* may alternatively be embedded in the body part 41*c*.

Figure 12:
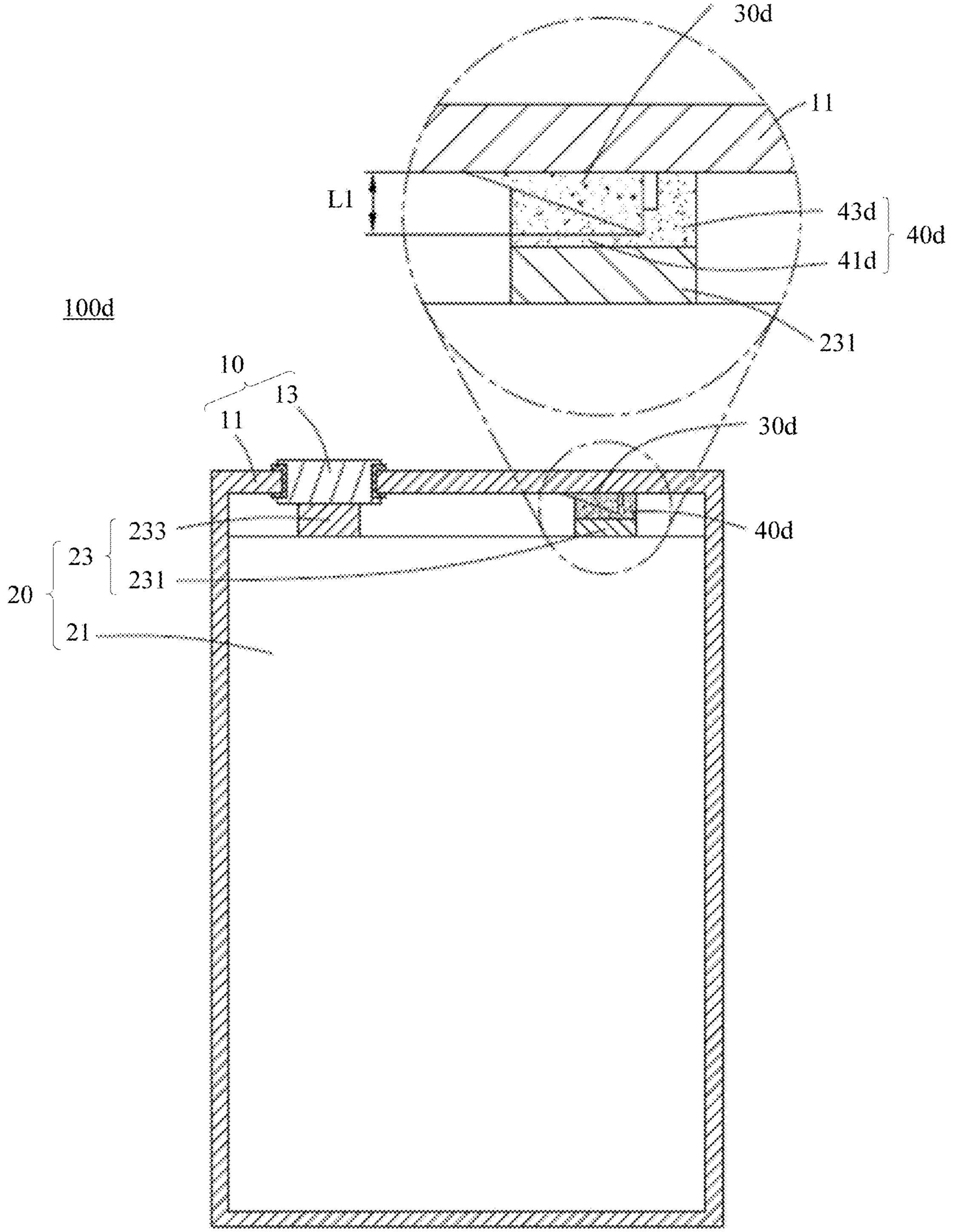
FIG. 12 is a sectional schematic diagram of another battery in which an overheat protection structure is disposed at a negative tab and the overheat protection structure is not triggered according to some embodiments of this application.

Referring to FIG. 12, another embodiment may further provide a battery 100*d*. A cross section of a thermal strain elastic component 30*d* may alternatively be a triangle. A first side of the triangle is connected to the first mechanical part 11, a second side is connected to an electric-conductor 40*d* and is embedded in a body part 41*d*, and a third side faces a convex part 43*d*.

Figure 13:
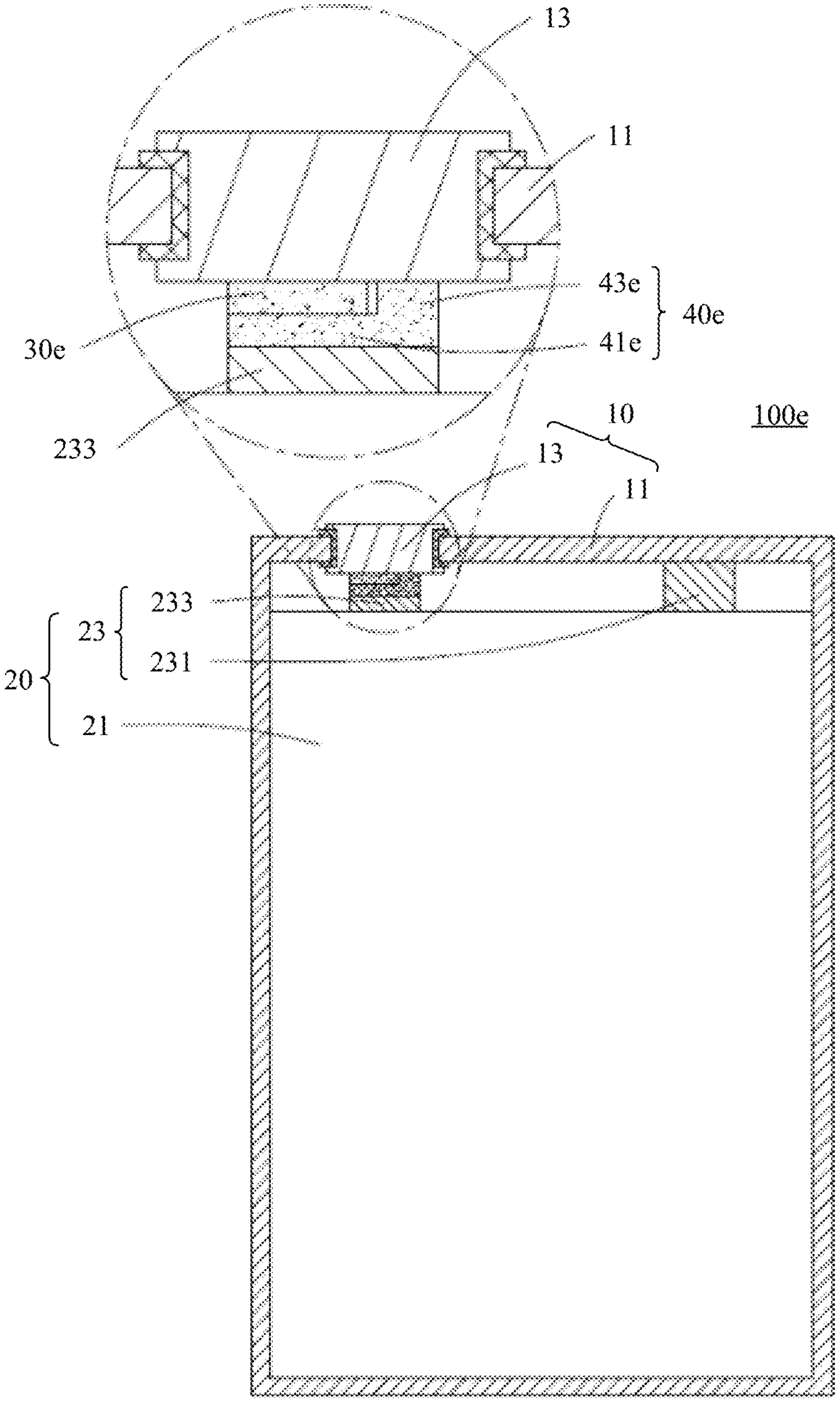
FIG. 13 is a sectional schematic diagram of a battery in which an overheat protection structure is disposed at a positive tab and the overheat protection structure is not triggered according to some embodiments of this application.
Figure 14:
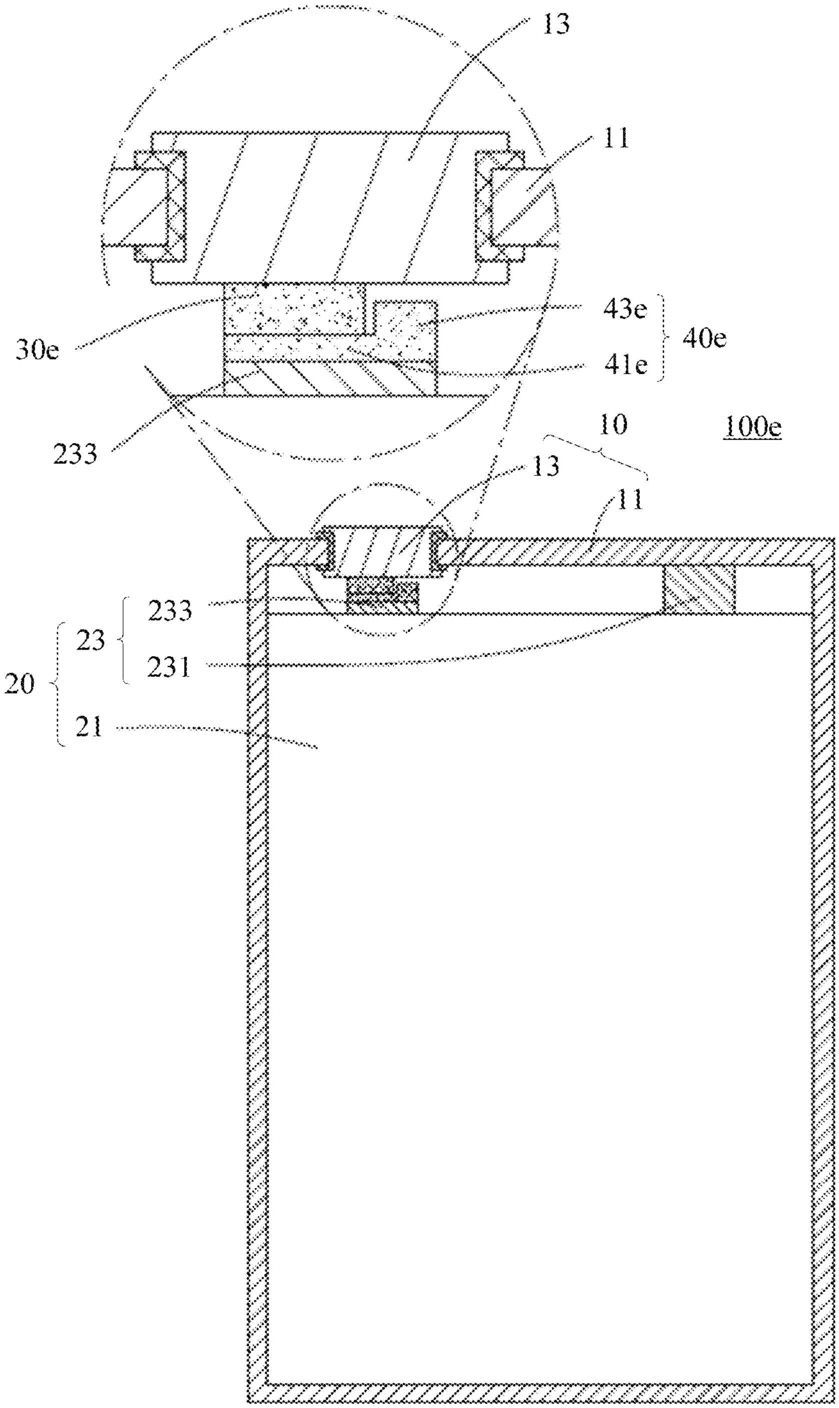
FIG. 14 is a sectional schematic diagram after the overheat protection structure shown in FIG. 13 is triggered.

Referring to FIG. 13 and FIG. 14, some embodiments of this application provide a battery 100*e*. An electric-conductor 40*e* and a thermal strain elastic component 30*e* are disposed at a positive tab 233, and the electric-conductor 40*e* and the thermal strain elastic component 30*e* are connected to a second mechanical part 13.

Specifically, a body part 41*e* of the electric-conductor 40*e* is connected to the positive tab 233, and a convex part 43*e* is located at an end that is of the body part and that is away from a side of the positive tab 233, and protrudes toward the second mechanical part 13. A first surface 31 of the thermal strain elastic component 30*e* is connected to the second mechanical part 13, a second surface 33 is connected to the body part 41*e*, and the thermal strain elastic component 30*e* is located on one side of the convex part 43*e* and is spaced apart from the convex part 43*e*. The thermal strain elastic component 30*e* is insulatively connected to the second mechanical part 13 and the electric-conductor 40*e*.

When the temperature of the battery cell 20 is relatively low: that is, a temperature of the battery 100*e* falls within a normal use temperature range, the thermal strain elastic component 30*e* is not deformed or significantly deformed, and the convex part 43*e* is connected to the second mechanical part 13, that is, the electric-conductor 40*e* is electrically connected to the positive tab 233 and the second mechanical part 13, so that the battery 100*e* is in a conducting state, and the battery 100*e* can be normally used. When the temperature of the battery cell 20 increases, heat is transferred to the positive tab 233 and the thermal strain elastic component 30*e*, and a temperature of the thermal strain elastic component 30*e* also increases: and when the temperature is greater than or equal to a threshold for safe use of the battery 100*e*, the thermal strain elastic component 30*e* is thermally expanded and deformed, so that a distance between the second mechanical part 13 and the body part 41*e* increases, and the body part 41*e* moves relative to the second mechanical part 13 until the body part 41*e* drives the convex part 43*e* to separate from the second mechanical part 13: that is, the electric-conductor 40*e* cuts off a current between the second mechanical part 13 and the positive tab 233, so that the battery 100*e* is in a disconnected state, so as to prevent the temperature of the battery cell 20 from further increasing. When the temperature of the battery cell 20 decreases, the thermal strain elastic component 30*e* gradually recovers from the deformation until the convex part 43*e* is in contact with the second mechanical part 13, so that the battery 100*e* is in a conducting state again.

Figure 15:
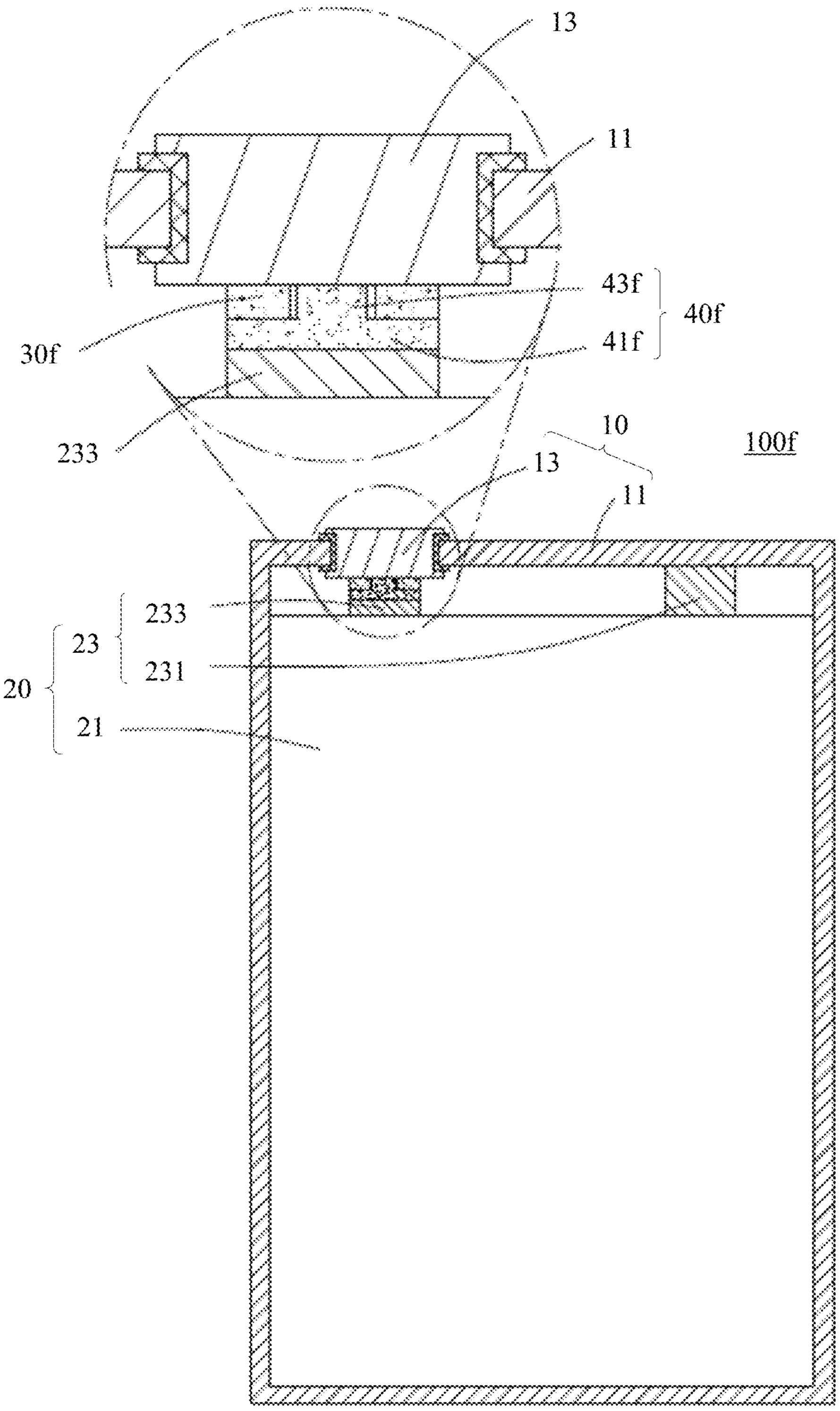
FIG. 15 is a sectional schematic diagram of a battery in which an overheat protection structure is disposed at a positive tab and the overheat protection structure is not triggered according to some embodiments of this application.
Figure 16:
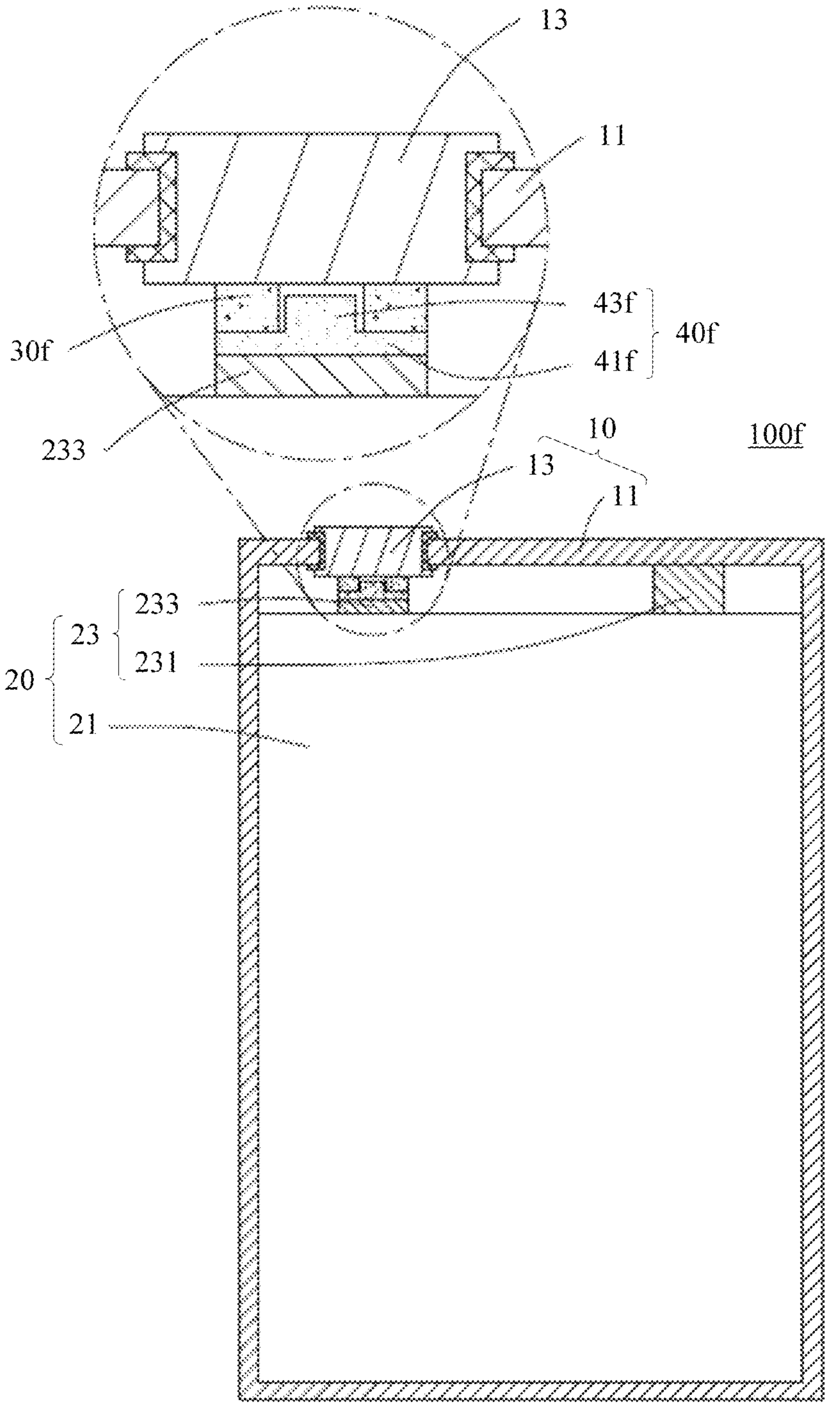
FIG. 16 is a sectional schematic diagram after the overheat protection structure shown in FIG. 15 is triggered.

Referring to FIG. 15 and FIG. 16, some embodiments of this application provide a battery 100*f*. A convex part 43*f* of an electric-conductor 40*f* protrudes from an intermediate position of a surface of a body part 41*f* of the electric-conductor 40*f*, and there are two thermal strain elastic components 30*f*, which are respectively located on two symmetrical sides of the convex part 43*f*. The two thermal strain elastic components 30*f* are symmetrically disposed. When the battery cell 20 is heated and a temperature of the battery cell 20 exceeds the threshold, the two thermal strain elastic components 30*f* may make a force acting on the body part 41*f* more even and greater, so that sensitivity of separating the second mechanical part 13 and the electric-conductor 40*f* can be improved, and the electric-conductor 40*f* is separated from the second mechanical part 13 in a timely manner to cut off a current.

In another embodiment, a quantity of the thermal strain elastic component 30*f* is not limited, and may be one or more. The thermal strain elastic component 30*f* may alternatively be a hollow ring, the convex part 43*f* is located in a middle of the thermal strain elastic component 30*f*, and the thermal strain elastic component 30*f* is disposed around a peripheral edge of the convex part 43*f*.

Figure 17:
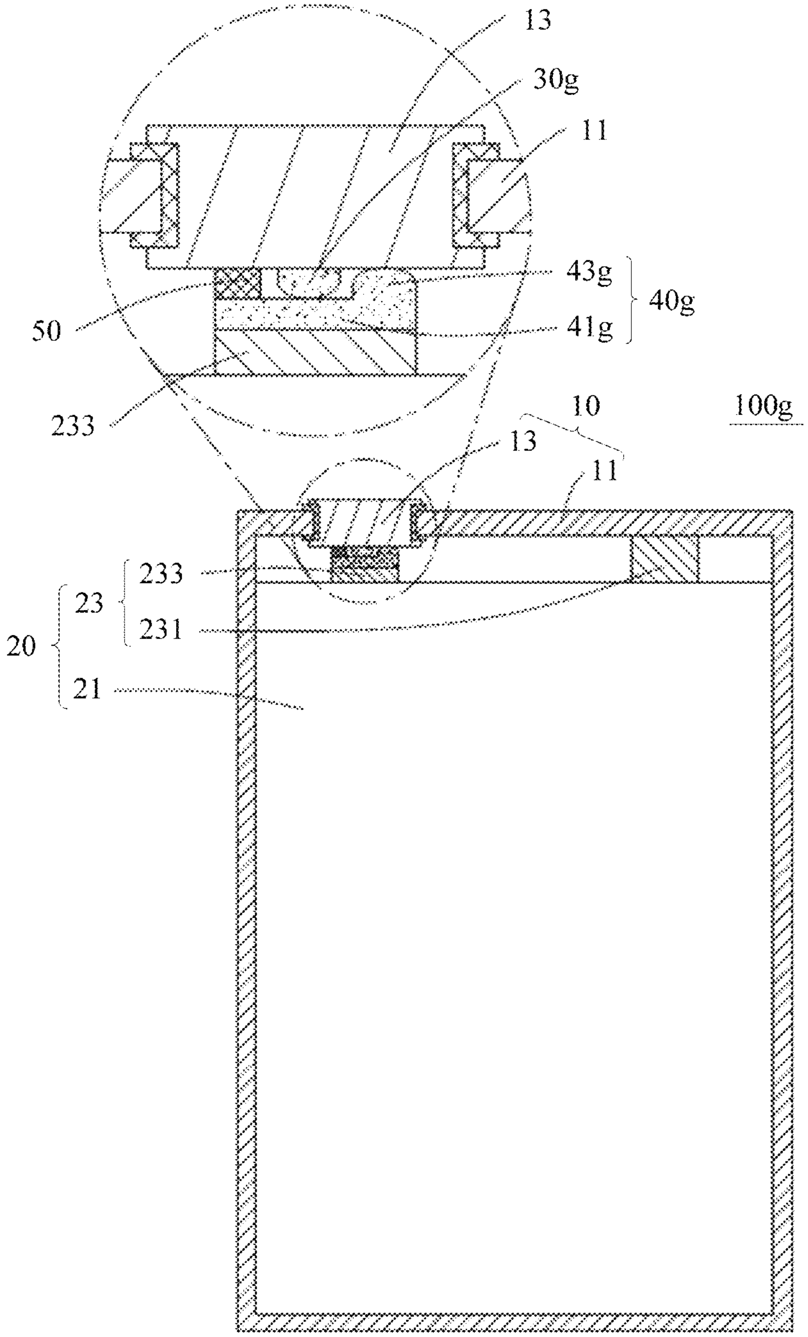
FIG. 17 is a sectional schematic diagram of a battery in which an overheat protection structure is disposed at a positive tab and the overheat protection structure is not triggered according to some embodiments of this application.
Figure 18:
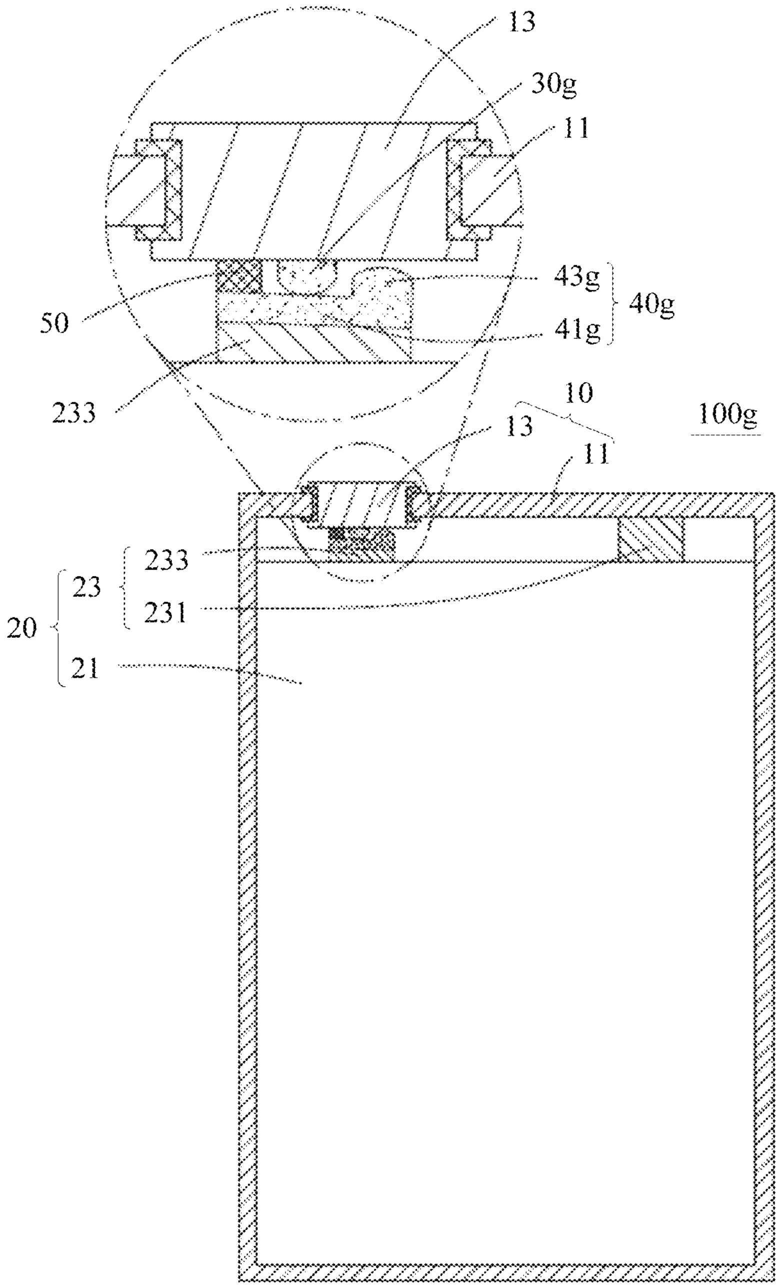
FIG. 18 is a sectional schematic diagram after the overheat protection structure shown in FIG. 17 is triggered.

Referring to FIG. 17 and FIG. 18, some embodiments of this application provide a battery 100*g*. A thermal strain elastic component 30*g* is a semi-ellipsoid, and the thermal strain elastic component 30*g* is connected to a part of a surface that is of a body part 41*g* of an electric-conductor 40*g* and that faces the second mechanical part 13. The battery 100*g* further includes a supporter 50, where the supporter 50 is located on a side that is of the thermal strain elastic component 30*g* and that faces a convex part 43*g*, and is disposed on a side that is of the body part 41*g* and that faces a second mechanical part 13. The supporter 50 is fixedly connected to the second mechanical part 13, and the supporter 50) is connected to one end of the body part 41*g*, so as to limit a distance between the supporter 50 and the body part 41*g*. The supporter 50 is electrically insulated from the second mechanical part 13 and the positive tab 233.

Figure 19:
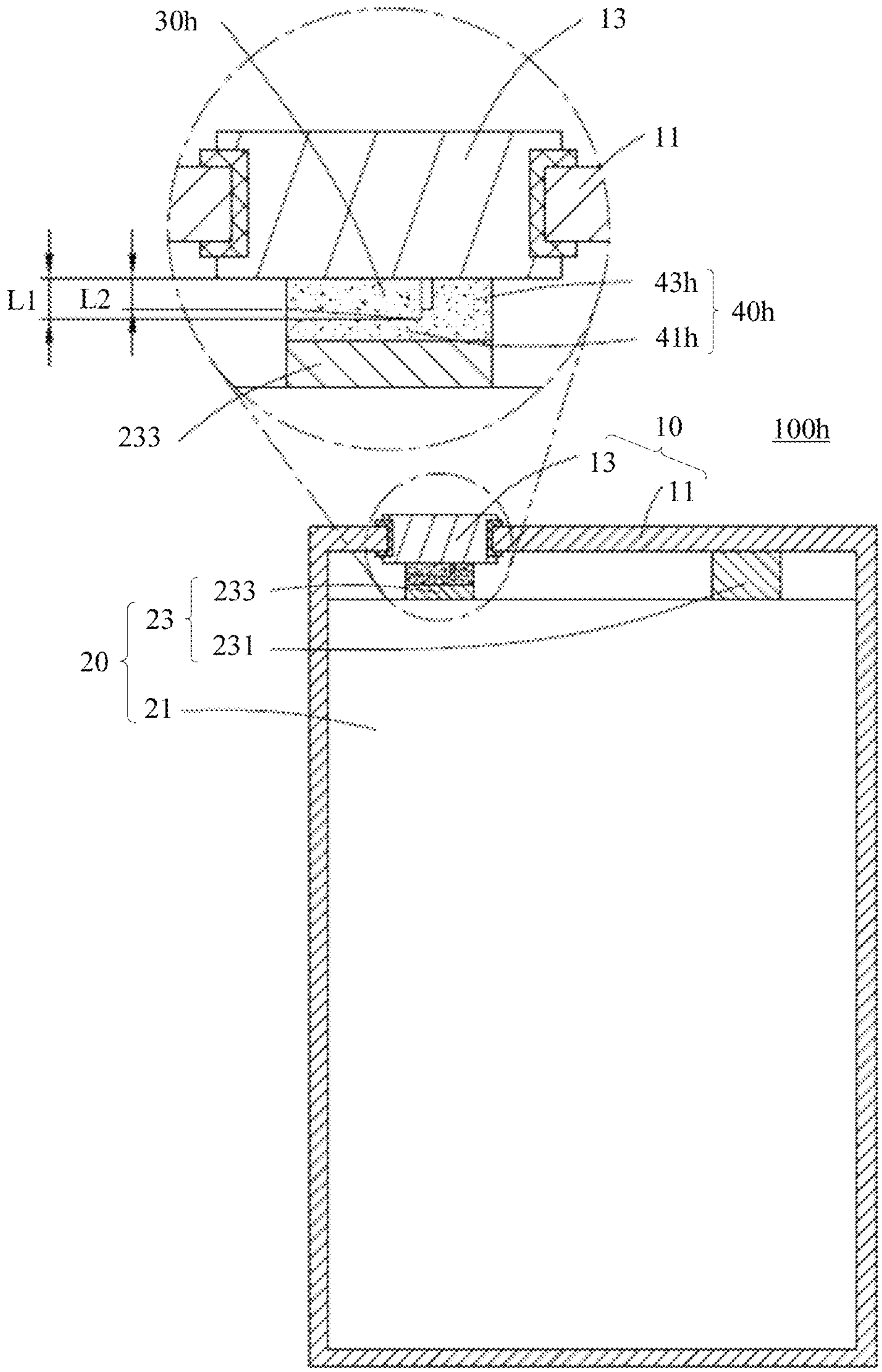
FIG. 19 is a sectional schematic diagram of a battery in which an overheat protection structure is disposed at a positive tab and the overheat protection structure is not triggered according to some embodiments of this application.

When the thermal strain elastic component 30*g* is thermally expanded, the thermal strain elastic component 30*g* drives the electric-conductor 40*g* to move relative to the first mechanical part 13, and the supporter 50 is configured to abut against an end that is of the electric-conductor 40*g* and that is away from the convex part 43*g*. The electric-conductor 40*g* takes the supporter 50 as a fulcrum, and one end with the convex part 43*g* rotates in a direction away from the second mechanical part 13, so that the convex part 43*g* can be separated from the second mechanical part 13 in a timely manner, thereby improving sensitivity of a thermal protection action, and avoiding that it is difficult to separate the electric-conductor 40*g* from the second mechanical part 13 due to a skew:

Referring to FIG. 19, some embodiments of this application provide a battery 100*h*. On a cross section of the thermal strain elastic component 30*h* along an overlaying direction of the housing 10, the thermal strain elastic component 30*h*, and the electric-conductor 40*h*, the thermal strain elastic component 30*h* has a first length L1 on a side facing the convex part 43*h*, and the thermal strain elastic component 30*h* has a second length L2 on a side away from the convex part 43*h*, where the first length L1 is greater than the second length L2. For example, a regular-shaped trapezoid is used as an example. A long side of the trapezoid faces the convex part 43*h*, and a short side of the trapezoid is away from the convex part 43*h*.

When the thermal strain elastic component 30*h* is thermally expanded, and a thermal expansion coefficient is the same, the thermal strain elastic component 30*h* generates a greater amount of deformation on a side facing the convex part 43*h* than on a side away from the convex part 43*h*, so as to ensure that the thermal strain elastic component 30*h* expands to separate the convex part 43*h* from the second mechanical part 13.

A part that is of the thermal strain elastic component 30*h* and that is close to the convex part 43*h* may alternatively be embedded in the body part 41*h*, and a contact area between the thermal strain elastic component 30*h* and the electric-conductor 40*h* may be increased, so as to further improve heat transfer of the electric-conductor 40*h* to the thermal strain elastic component 30*h*, thereby improving sensitivity of an overheat protection structure.

Figure 20:
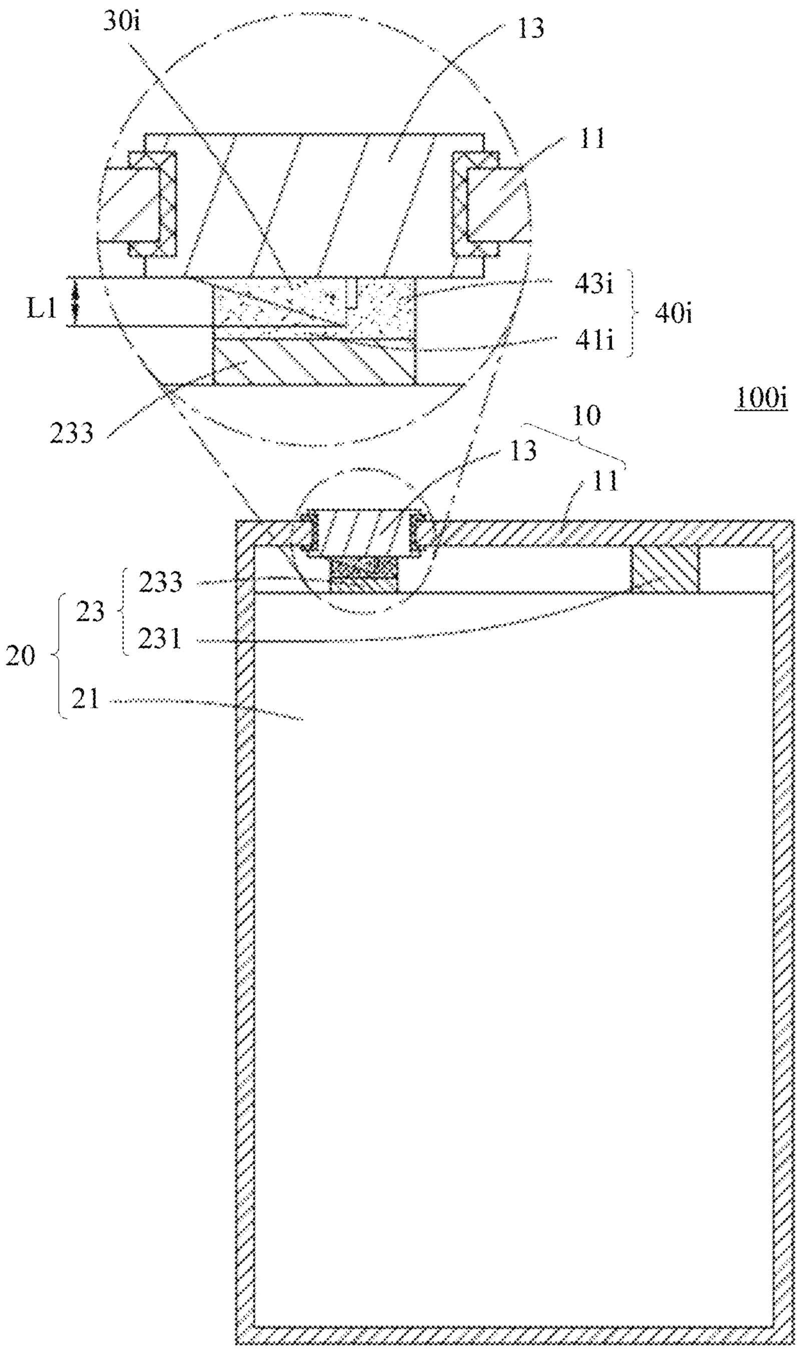
FIG. 20 is a sectional schematic diagram of another battery in which an overheat protection structure is disposed at a positive tab and the overheat protection structure is not triggered according to some embodiments of this application.

In another embodiment, referring to FIG. 20, another embodiment may further provide a battery 100*i*. A cross section of a thermal strain elastic component 30*i* may alternatively be a triangle. A first side of the triangle is connected to the second mechanical part 13, a second side is connected to an electric-conductor 40*i* and is embedded in the electric-conductor 40*i*, and a third side faces a convex part 43*i*.

Figure 5:
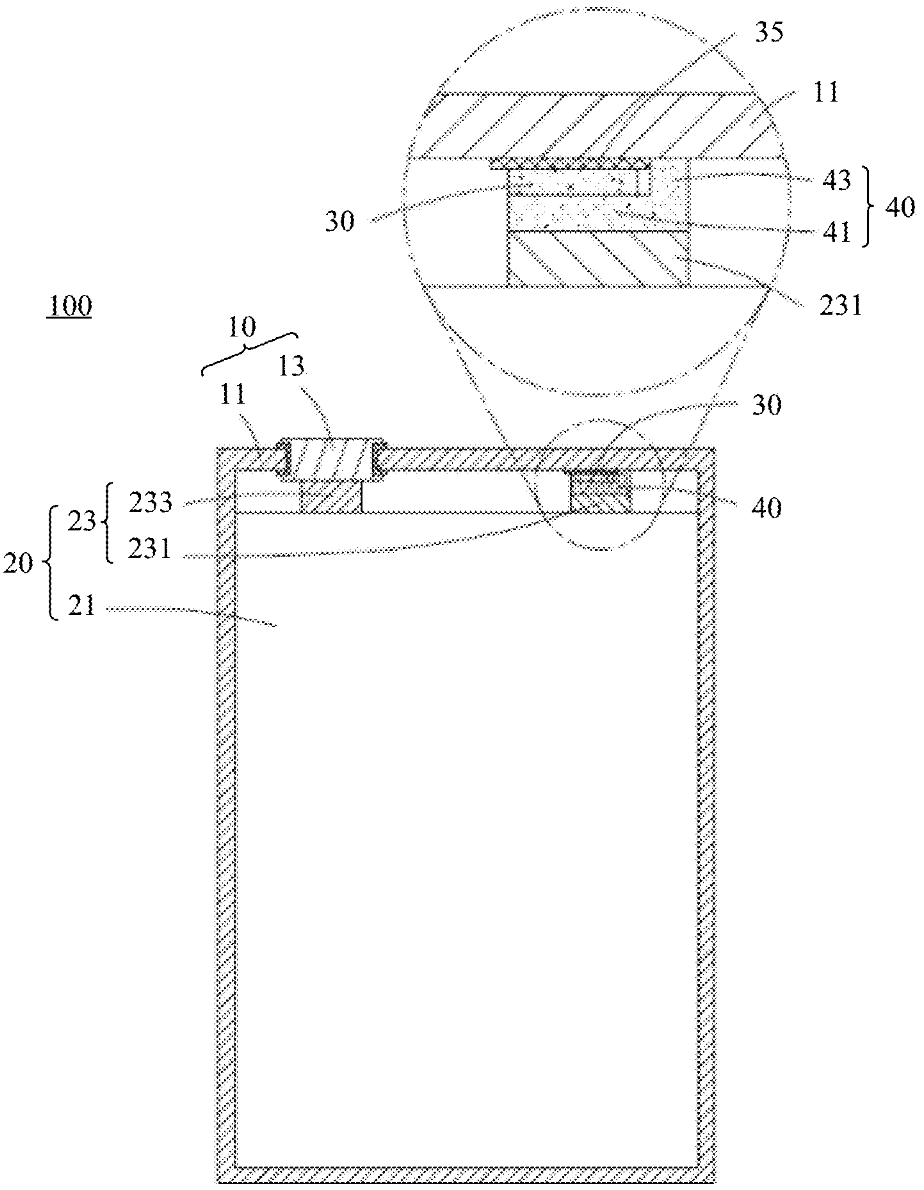
FIG. 5 is a sectional schematic diagram of a battery in which an overheat protection structure is disposed at a negative tab and the overheat protection structure is not triggered according to some embodiments of this application.
Figure 6:
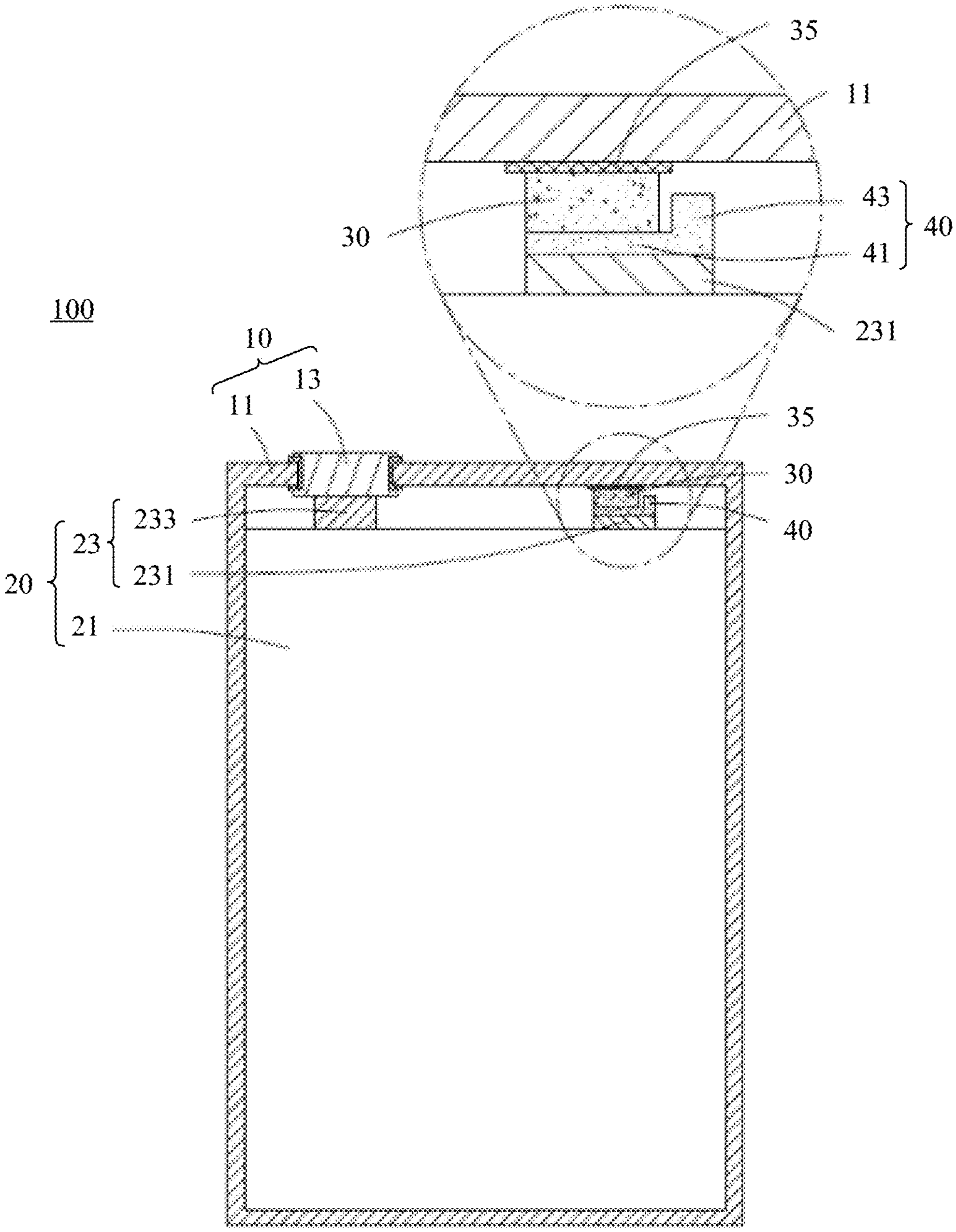
FIG. 6 is a sectional schematic diagram after the overheat protection structure shown in FIG. 5 is triggered.
Figure 21:
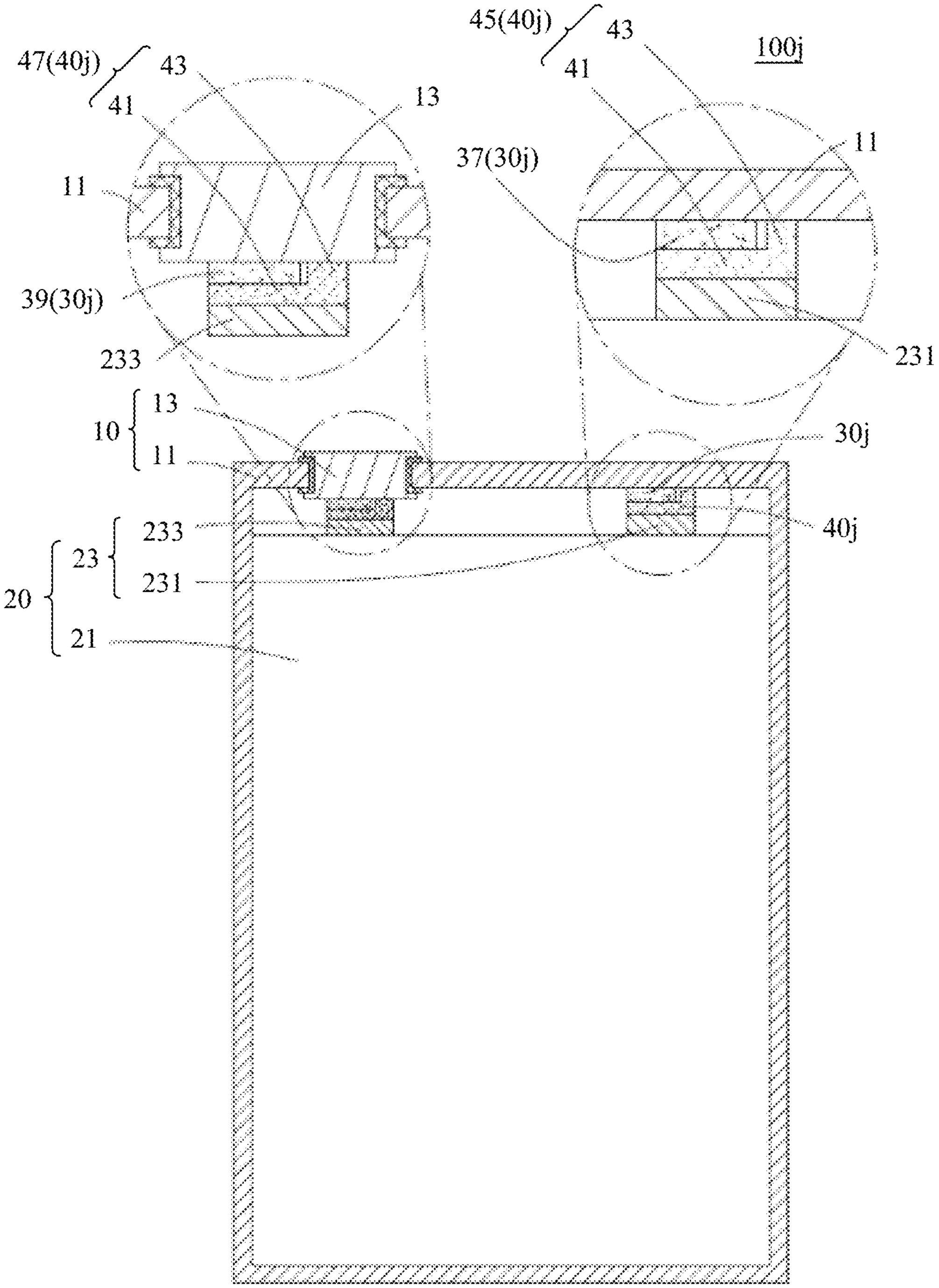
FIG. 21 is a sectional schematic diagram of a battery in which an overheat protection structure is disposed at both a negative tab and a positive tab and the overheat protection structure is not triggered according to some embodiments of this application.

Some embodiments of this application provide a battery 100*j*. Referring to FIG. 21, overheat protection structures are disposed at both a negative tab 231 and a positive tab 233. That is, an overheat protection structure that is disposed at the negative tab 231, as shown in FIG. 3. FIG. 5. FIG. 7. FIG. 9. FIG. 11, and FIG. 12, and an overheat protection structure that is disposed at the positive tab 233, as shown in in FIG. 13. FIG. 15. FIG. 17. FIG. 19, and FIG. 20, may be mutually combined. Overheat protection structures are disposed at both the negative tab 231 and the positive tab 233, so that the battery 100*j* has a dual overheat protection function, thereby further improving safety of the battery 100*j* in implementing timely overheat protection.

Specifically, a thermal strain elastic component 30*j* includes a first thermal strain elastic component 37 and a second thermal strain elastic component 39, and an electric-conductor 40*j* includes a first electric-conductor 45 and a second electric-conductor 47. The first thermal strain elastic component 37 and the first electric-conductor 45 are located between the first mechanical part 11 and the negative tab 231, and are connected to the first mechanical part 11 and the negative tab 231. The second thermal strain elastic component 39 and the second electric-conductor 47 are located between the second mechanical part 13 and the positive tab 233, and are connected to the second mechanical part 13 and the positive tab 233.

An overheat protection structure is disposed at the negative tab 231 and/or the positive tab 233, and an overheat protection function of the battery 100*j* can be implemented. In comparison, disposing the overheat protection structure at the negative tab 231 (the first, second, third, and fourth embodiments) occupies less space inside the battery 100*j*, because when the overheat protection structure is disposed at the positive tab 233 (the fifth, the sixth, the seventh, and the eighth embodiments), a part of the second mechanical part 13 protrudes toward the positive tab 233, occupies a part of a distance between the first mechanical part 11 and the positive tab 233, while a distance between the negative electrode tab 231 and the first mechanical part 11 is larger, and there is enough space for disposing the electric-conductor 40*j* and the thermal strain elastic component 30*j*. Overheat protection structures are disposed at both the negative tab 231 and the positive tab 233, and consequently: costs are relatively increased, and contact impedance is also increased.

It may be understood that, if the foregoing features do not conflict, the features in the implementations and the implementations of this application may be mutually combined.

Figure 22:
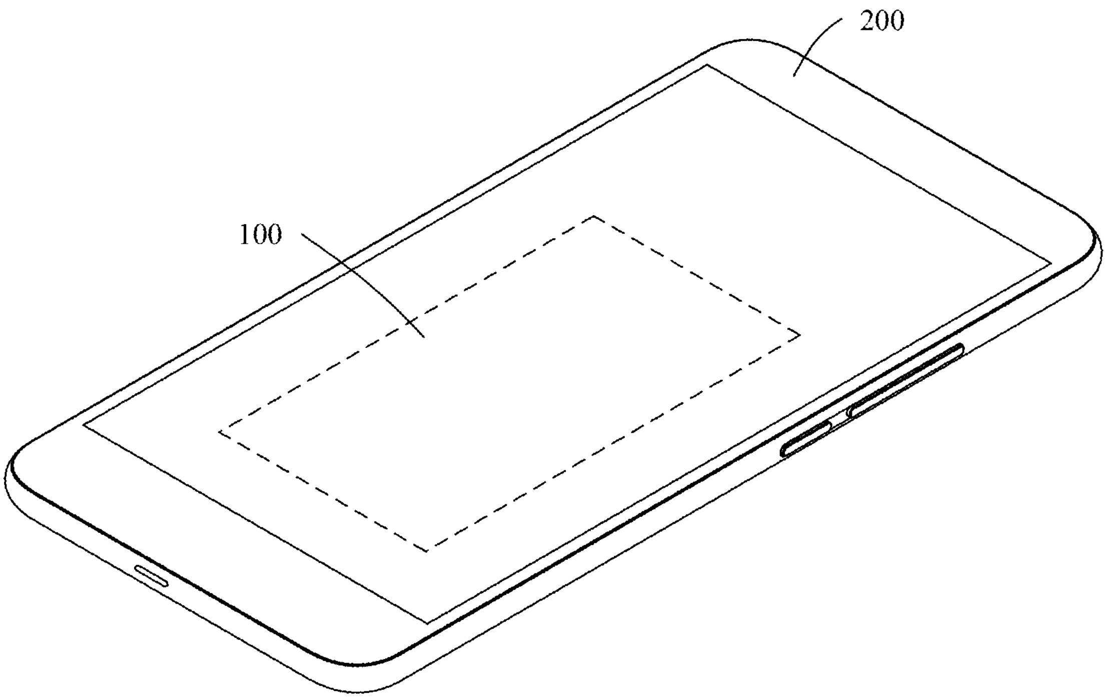
FIG. 22 is a schematic diagram of a structure of an electronic device, which is a mobile phone, according to an embodiment of this application.

This application further provides an electronic device 200. The electronic device 200 includes any one or more of the batteries 100, 100*a*, 100*b*, 100*c*, 100*d*, 100*e*, 100*f*, 100*g*, 100*h*, 100*i*, and 100*j* in the foregoing embodiments. The electronic device 200 may be a consumer electronic product (such as a mobile communication apparatus, a tablet computer, a notebook computer, or a wearable device), an electric tool, an unmanned aerial vehicle, an energy storage apparatus, a power apparatus, or the like. In an implementation, referring to FIG. 22, the electronic device 200 is a mobile phone, and a battery 100 is disposed in the mobile phone. In some usage scenarios, such as using a mobile phone for a long time, charging a mobile phone for a long time, high-power charging, an overheat protection structure may play an overheat protection role when the battery 100 is overheated. It may be understood that the foregoing use scenarios are examples, and are not limited thereto.

The following describes a function of the overheat protection structure of the battery 100 in this application based on a specific embodiment and comparative examples. Embodiments 1 to 9 of this application separately use battery structures in FIG. 3, FIG. 7, FIG. 9, FIG. 11, FIG. 13, FIG. 15, FIG. 17, FIG. 19, and FIG. 21.

Comparative Example 1

An overheat protection structure is disposed outside a housing.

Comparative Example 2

An overheat protection structure is not disposed for the battery.

Batteries in the comparative examples and the embodiments are placed in a battery explosion-proof box, and thermocouples are fastened to tabs 23 of the batteries to detect temperatures. The battery is connected to the power supply, charged to 10V with a constant current density of 1 C, and then maintained at a constant voltage for 1 hour. If the battery does not smoke, fire or explode, the test is passed. Otherwise, the test fails. A temperature of the tab 23 is recorded when the overheat protection structure is triggered. Each group of batteries with the structure shown in each embodiment and each comparative example includes 10 batteries, and each battery is tested once. Test results are shown in Table 1.

TABLE 1

| Battery structure type | Quantity of batteries that passed the test | Average temperature when an overheat protection structure is triggered |
|---|---|---|
| Embodiment 1 | 10 | 72.3° C. |
| Embodiment 2 | 10 | 71.9° C. |
| Embodiment 3 | 10 | 70.4° C. |
| Embodiment 4 | 10 | 72.7° C. |
| Embodiment 5 | 10 | 73.6° C. |
| Embodiment 6 | 10 | 72.5° C. |
| Embodiment 7 | 10 | 71.2° C. |
| Embodiment 8 | 10 | 73.4° C. |
| Embodiment 9 | 10 | 70.5° C. |
| Comparative example 1 | 7 | 83.8° C. |
| Comparative example 2 | 0 | \ |

It can be learned from the foregoing test results that 100% of batteries 100 in Embodiment 1 to Embodiment 9 pass the overheating test, only some batteries in Embodiment 1 pass the overheating test, and all batteries that have no overheat protection structure in Embodiment 2 fail in the overheating test.

In addition, an average temperature of the batteries 100 provided in Embodiment 1 to Embodiment 9 when the overheat protection structure is triggered is 70° ° C. to 75° C., and an average temperature of the batteries in Embodiment 1 when the overheat protection structure is triggered is 83.8° C., which is much higher than the average temperature in Embodiment 1 to Embodiment 9. That is, in Embodiment 1 to Embodiment 9, when the batteries 100 are heated and overheated, currents can be cut off in a timely manner, so that the batteries 100 are in a safe state.

According to the battery 100 provided in this application, the overheat protection structure (a structure formed by the housing 10, the battery cell 20, the thermal strain elastic component 30, and the electric-conductor 40) is disposed inside the housing 10. Compared with an overheat protection structure disposed outside the housing 10, the foregoing protection structure has a short heat transfer path with a region with a highest temperature in the battery 100 (a region of the tab 23), and a current collector on the battery cell 20 is more efficient in heat conduction than the housing 10. Therefore, the foregoing overheat protection structure in this application has faster thermal conduction, higher sensitivity of a heat protection action, and a better overheat protection effect for the battery. The farther the overheat protection structure is from the highest temperature area in the battery 100, the more uncontrollable factors, and the greater the probability that the overheat protection structure does not perform overheat protection in a timely manner, and consequently, the battery 100 is not safe. In addition, when the battery 100 is overheated, the foregoing overheat protection structure disconnects an electrical connection between the electric-conductor 40 and the housing 10, that is, the current in the battery 100 is completely cut off. Before a temperature of the battery cell decreases to a safe temperature, the battery 100 stops working to prevent generation of more heat.

The foregoing implementations are merely used to describe the technical solutions of this application, but are not limited thereto. Although this application is described in detail with reference to the foregoing preferred implementations, persons of ordinary skill in the art should understand that modifications or equivalent replacements of the technical solutions of this application may be performed without departing from the spirit and scope of the technical solutions of this application.

What is claimed is:

1. A battery, comprising:

a housing including a mechanical part, the housing comprising a cavity, and the mechanical part forming at least a portion of two or more sides of the cavity;

a battery cell, located in the cavity, wherein the battery cell comprises a tab;

a thermal strain elastic component, located between the mechanical part of the housing and the tab and insulatively connected to the housing and/or the tab; and an electric-conductor, located between the housing and the tab, wherein when a temperature of the battery cell is less than a threshold, the electric-conductor is electrically connected to the mechanical part of the housing such that the mechanical part serves as a terminal for connecting the battery cell to an external circuit, and when the temperature of the battery cell is greater than or equal to the threshold, the thermal strain elastic component is deformed, so that the electric-conductor is separated from the mechanical part of housing, wherein the electric-conductor comprises a body part and a convex part, the body part is connected to the convex part the body part is connected to the tab and the thermal strain elastic component, and the convex part faces the housing and is detachably connected to the housing, and wherein the thermal strain elastic component is connected to a part of a surface that is of the body part and that faces the housing, and the battery further comprises a supporter, wherein the supporter is located on a side that is of the thermal strain elastic component and that is away from the convex part, and the supporter is fastened to the housing and connected to the body part.

2. The battery according to claim 1, wherein the mechanical part comprises a first mechanical part, the housing comprises the first mechanical part and a second mechanical part, the first mechanical part and the second mechanical part are insulatively connected and are enclosed to form the cavity, the tab comprises a negative tab, and the thermal strain elastic component and the electric-conductor are located between the first mechanical part and the negative tab.

3. The battery according to claim 1, wherein the mechanical part comprises a first mechanical part, the housing comprises the first mechanical part and a second mechanical part, the first mechanical part and the second mechanical part are insulatively connected and are enclosed to form the cavity, the tab comprises a positive tab, and the thermal strain elastic component and the electric-conductor are located between the second mechanical part and the positive tab.

4. The battery according to claim 1, wherein the mechanical part comprises a first mechanical part, the housing comprises the first mechanical part and a second mechanical part, the first mechanical part and the second mechanical part are insulatively connected and are enclosed to form the cavity, the tab comprises a negative tab and a positive tab, the thermal strain elastic component comprises a first thermal strain elastic component and a second thermal strain elastic component, and the electric-conductor comprises a first electric-conductor and a second electric-conductor; the first thermal strain elastic component and the first electric-conductor are located between the first mechanical part and the negative tab; and the second thermal strain elastic component and the second electric-conductor are located between the second mechanical part and the positive tab.

5. The battery according to claim 1, wherein the thermal strain elastic component is located on a surface that is of the body part and that faces the housing, and the thermal strain elastic component is spaced apart from the convex part.

6. The battery according to claim 1, wherein there are a plurality of thermal strain elastic components, and the plurality of thermal strain elastic components are enclosed around a peripheral edge of the convex part and are connected to the housing.

7. The battery according to claim 1, wherein the thermal strain elastic component is a hollow ring, the convex part is in a middle of the thermal strain elastic component, and the thermal strain elastic component is disposed around a peripheral edge of the convex part.

8. The battery according to claim 1, wherein on a cross section of the thermal strain elastic component along an overlaying direction of the housing, the thermal strain elastic component, and the electric-conductor, the thermal strain elastic component has a first length on a side facing the convex part, and the thermal strain elastic component has a second length on a side away from the convex part, wherein the first length is greater than the second length.

9. The battery according to claim 8, wherein the cross section of the thermal strain elastic component along an overlaying direction of the housing, the thermal strain elastic component, and the electric-conductor is a trapezoid or a triangle.

10. The battery according to claim 8, wherein a part of the thermal strain elastic component is embedded in the body part.

11. The battery according to claim 1, wherein a shape of the thermal strain elastic component is at least one of a cuboid, a cube, an ellipsoid, and a semi-ellipsoid.

12. The battery according to claim 1, wherein a material of the thermal strain elastic component is an insulating material.

13. The battery according to claim 1, wherein a material of the thermal strain elastic component is a conductive material, the battery further comprises an insulation layer, and the insulation layer is located between the thermal strain elastic component and the housing and/or the body part.

14. The battery according to claim 1, wherein the threshold is 70° C. to 75° C.

15. The battery according to claim 1, wherein the tab is a single tab.

16. The battery according to claim 1, wherein the tab is assembled from a plurality of sub-tabs.

17. The battery according to claim 2, wherein the first mechanical part is a metal shell, and the second mechanical part is a battery post; or both the first mechanical part and the second mechanical part are metal shells.

18. An electronic device, comprising a battery, wherein the battery comprising:

a housing including a mechanical part, the housing comprising a cavity, and the mechanical part forming at least a portion of two or more sides of the cavity;

a battery cell, located in the cavity, wherein the battery cell comprises a tab;

a thermal strain elastic component, located between the mechanical part of the housing and the tab and insulatively connected to the housing and/or the tab; and an electric-conductor, located between the housing and the tab, wherein when a temperature of the battery cell is less than a threshold, the electric-conductor is electrically connected to the mechanical part of the housing such that the mechanical part serves as a terminal for connecting the battery to an external circuit, and when the temperature of the battery cell is greater than or equal to the threshold, the thermal strain elastic component is deformed, so that the electric-conductor is separated from mechanical part of the housing, wherein the electric-conductor comprises a body part and a convex part, the body part is connected to the convex part, the body part is connected to the tab and the thermal strain elastic component, and the convex part faces the housing and is detachably connected to the bousing, and wherein the thermal strain elastic component is connected to a part of a surface that is of the body part and that faces the housing; and the battery further comprises a supporter wherein the supporter is located on a side that is of the thermal strain elastic component and that is away from the convex part, and the supporter is fastened to the housing and connected to the body part.

19. The electronic device according to claim 18, wherein on a cross section of the thermal strain elastic component along an overlaying direction of the housing, the thermal strain elastic component, and the electric-conductor, the thermal strain elastic component has a first length on a side facing the convex part, and the thermal strain elastic component has a second length on a side away from the convex part, wherein the first length is greater than the second length.

20. The electronic device according to claim 19, wherein the cross section of the thermal strain elastic component along an overlaying direction of the housing, the thermal strain elastic component, and the electric-conductor is a trapezoid or a triangle.

* * * * *